P. W. DRUITT & W. R. GILPIN.
TYPOGRAPHIC MACHINE.
APPLICATION FILED MAR. 13, 1914.
1,185,384. Patented May 30, 1916.
18 SHEETS—SHEET 6.
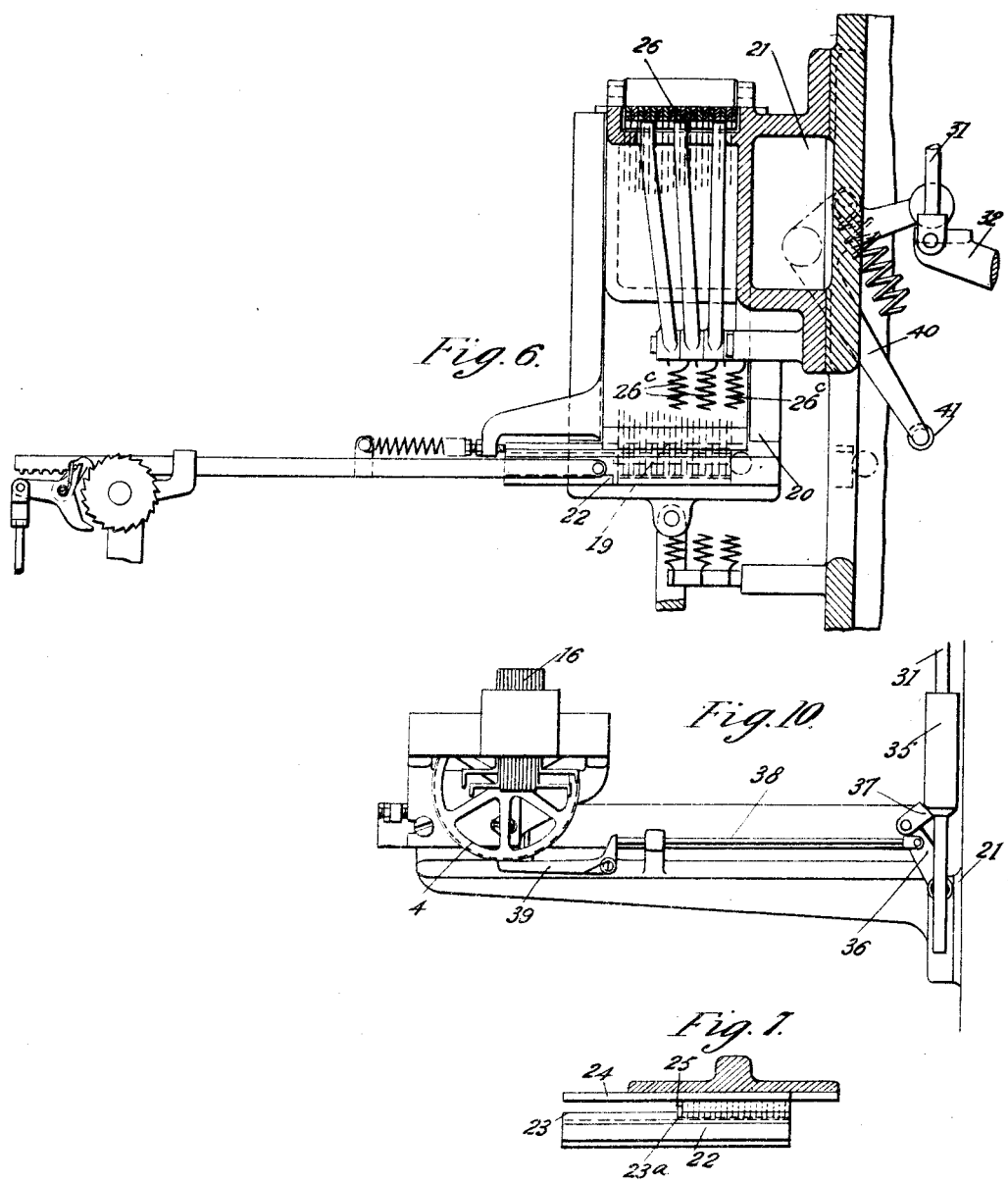

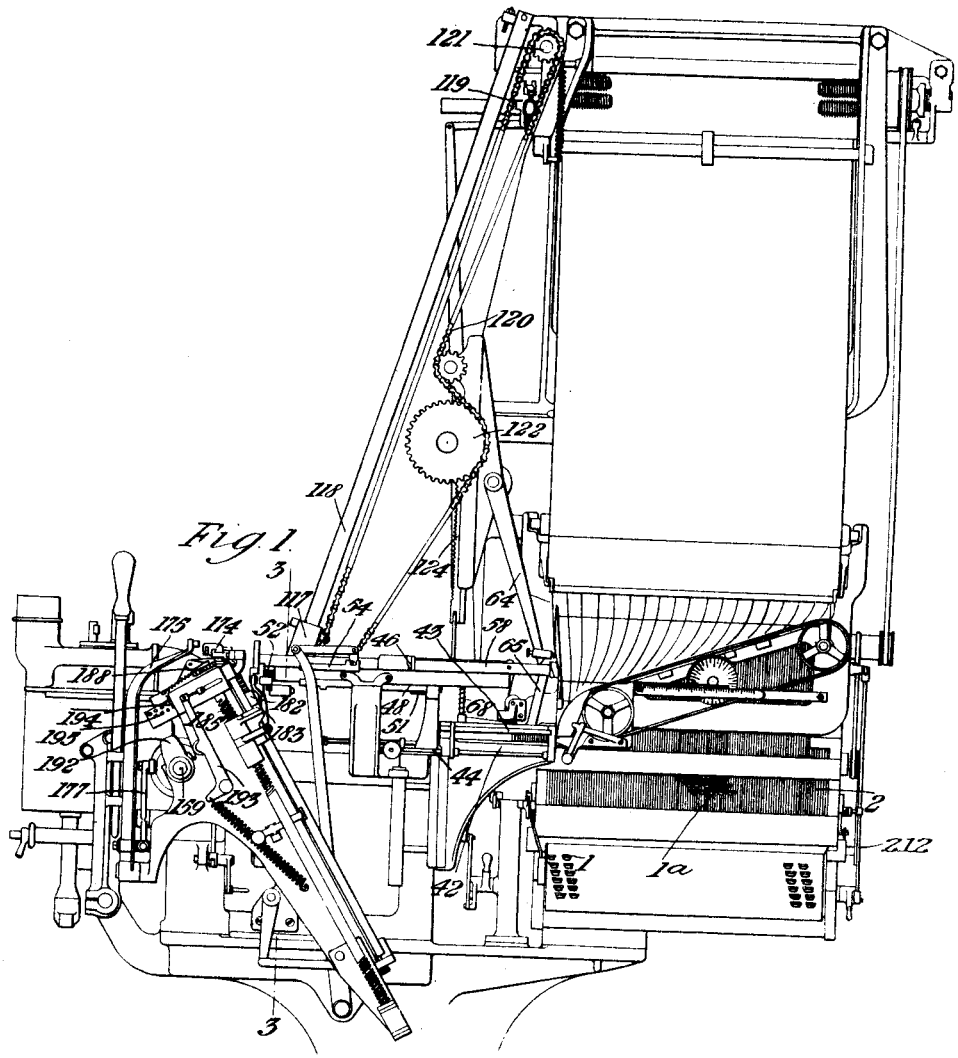

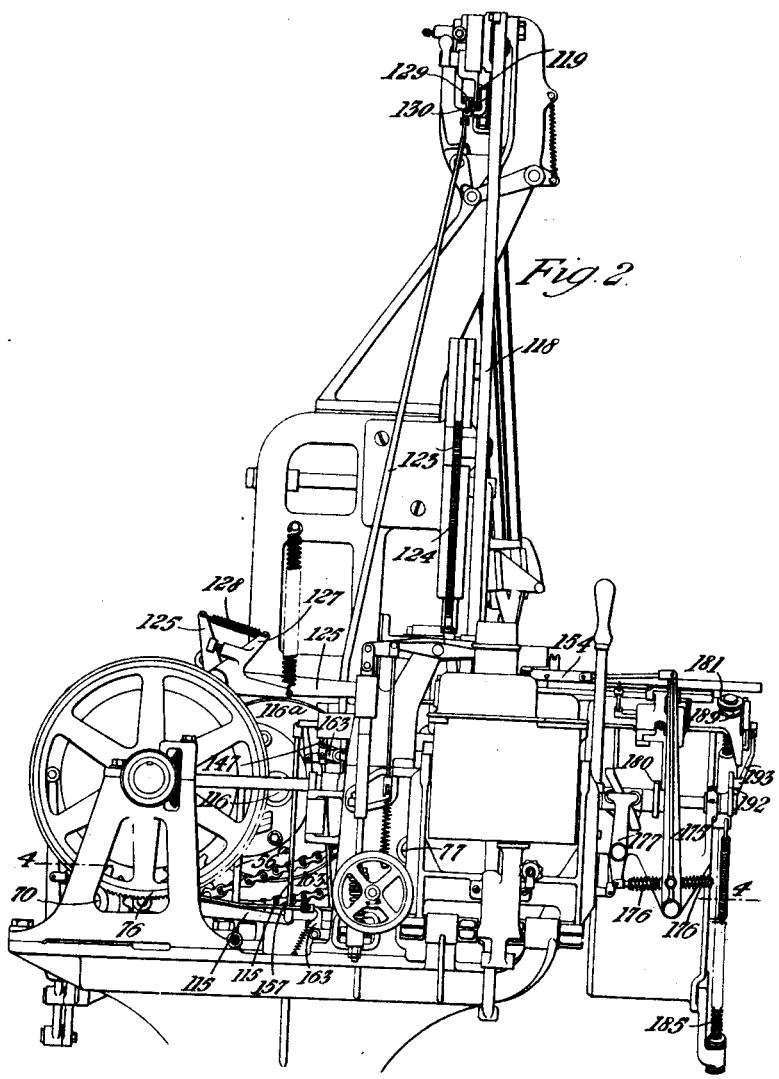

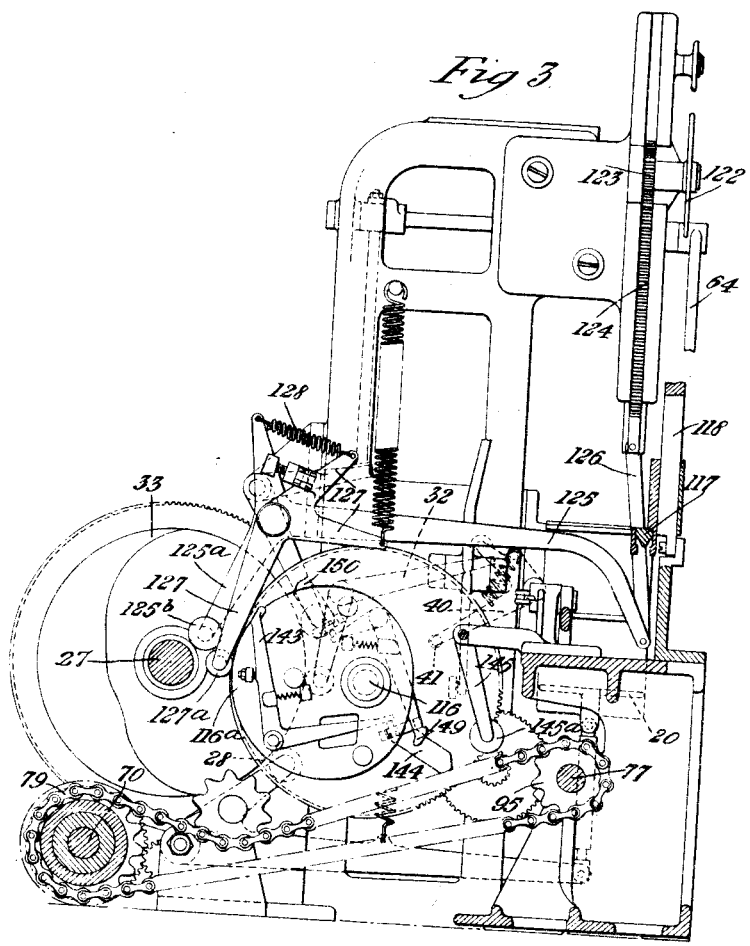

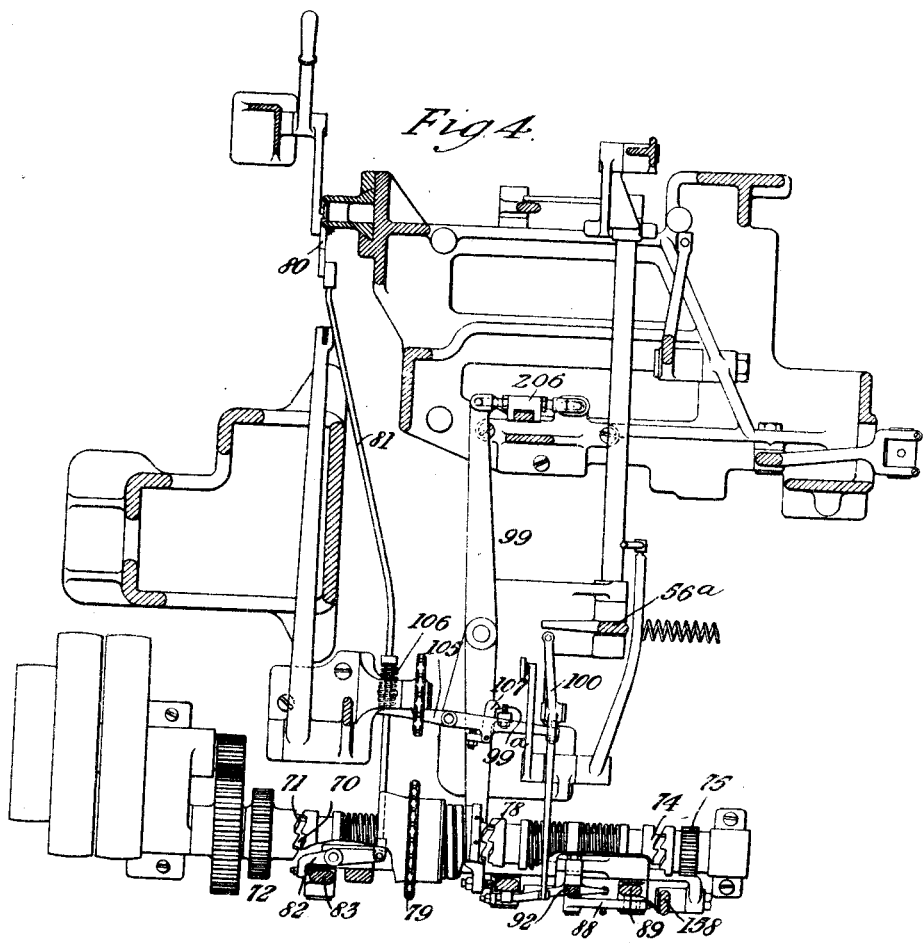

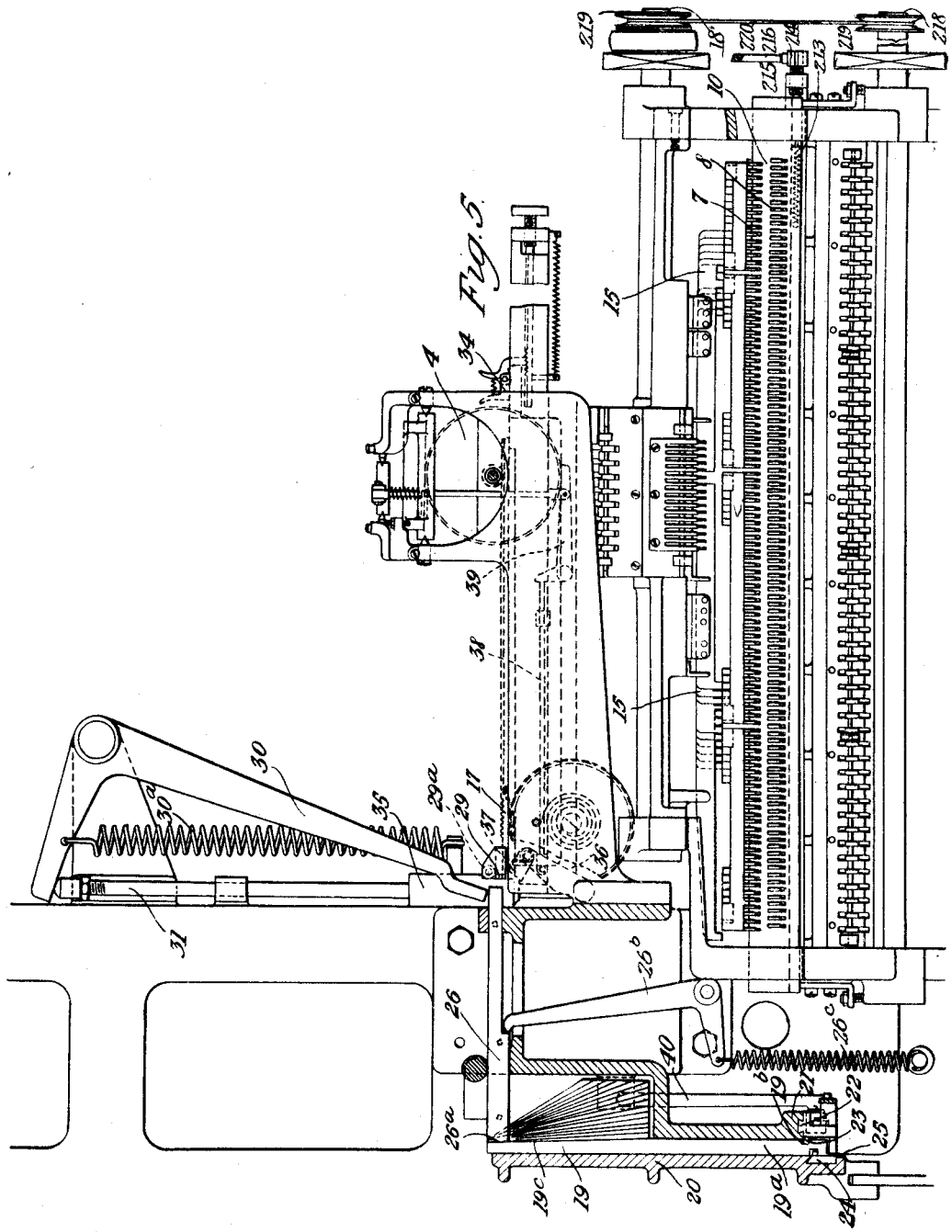

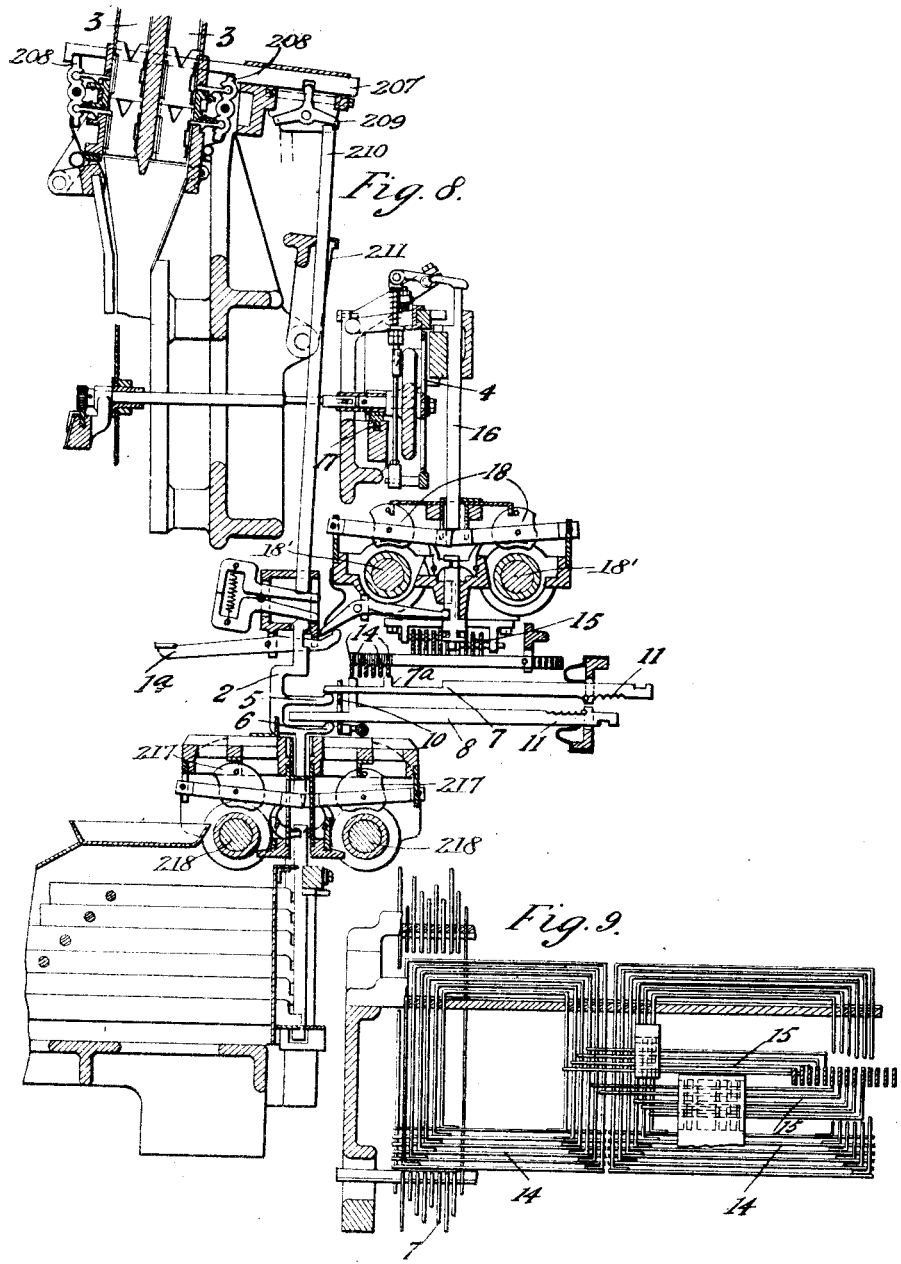

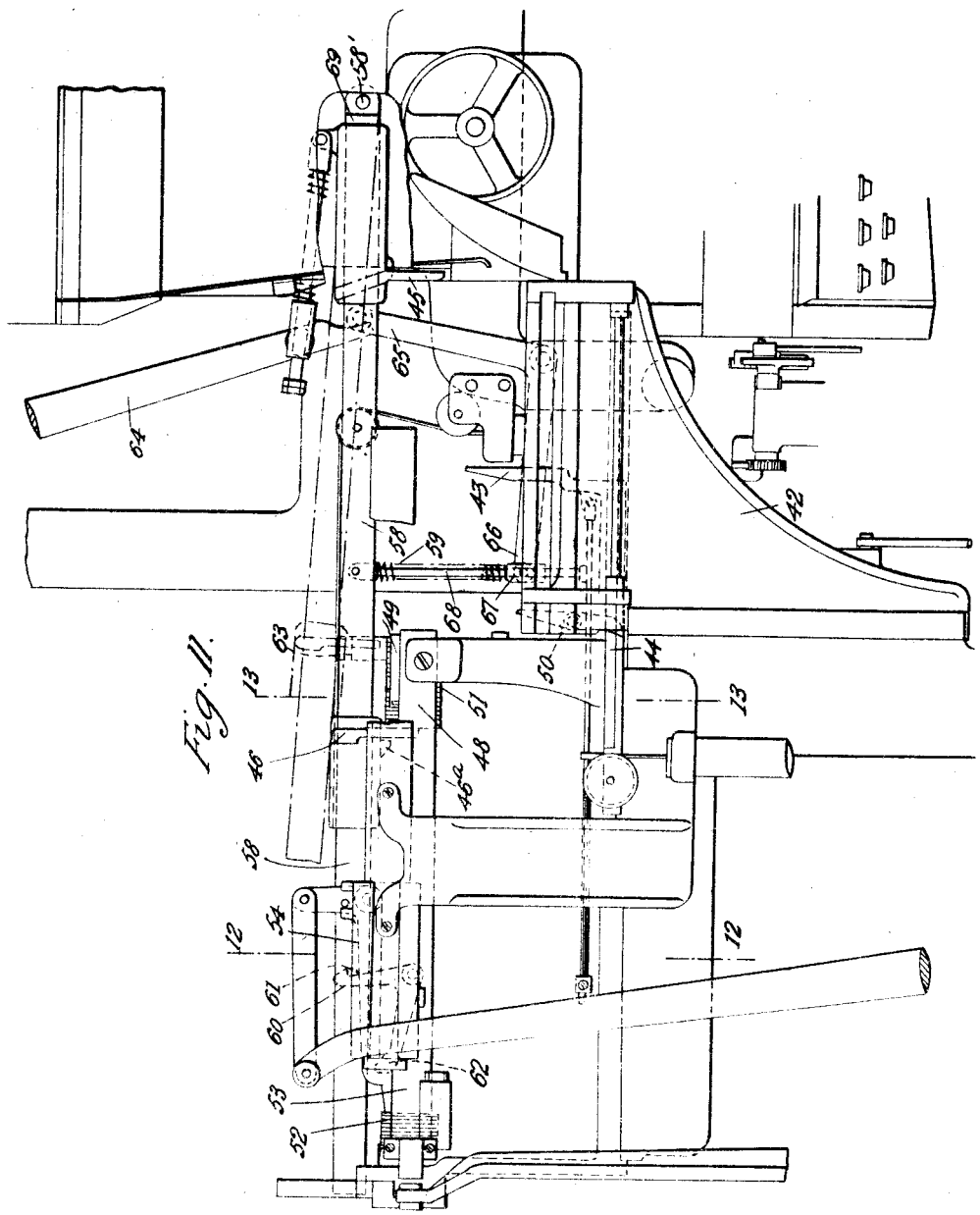

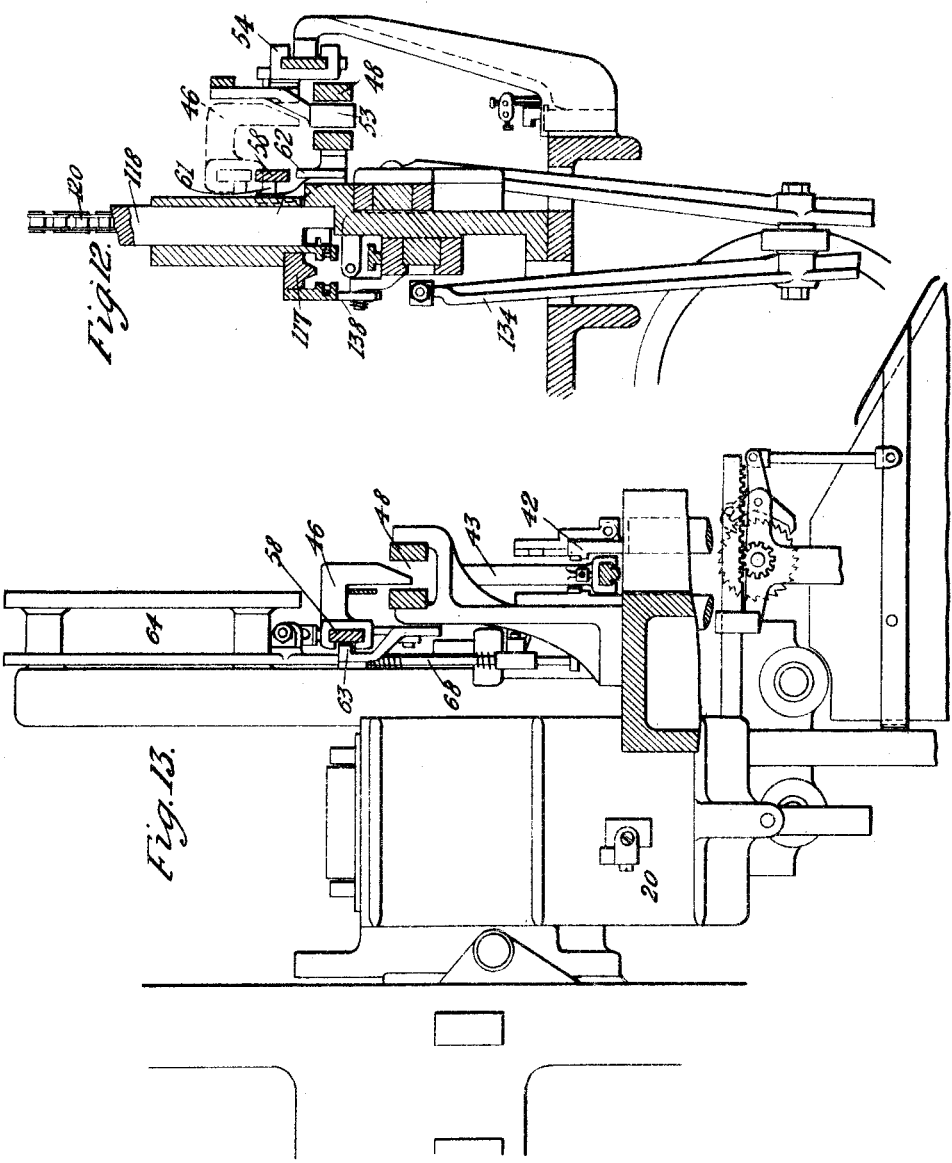

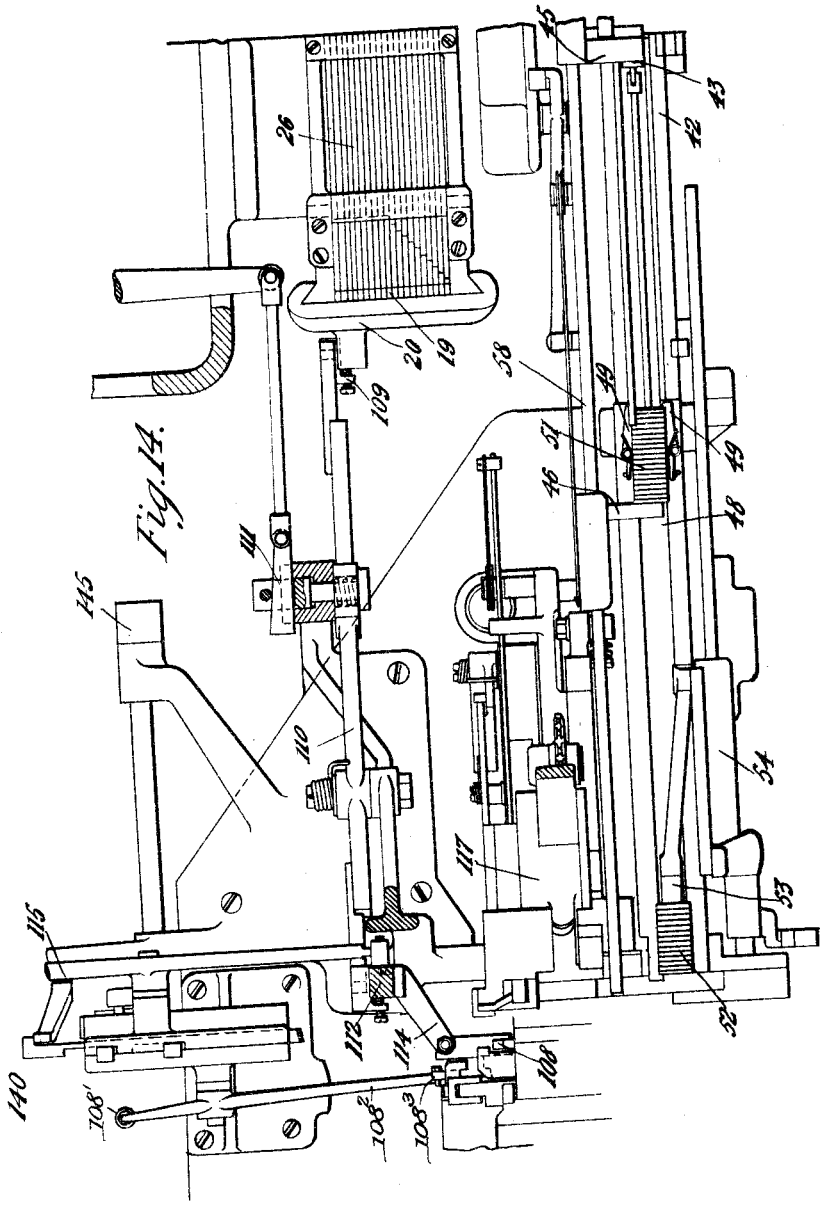

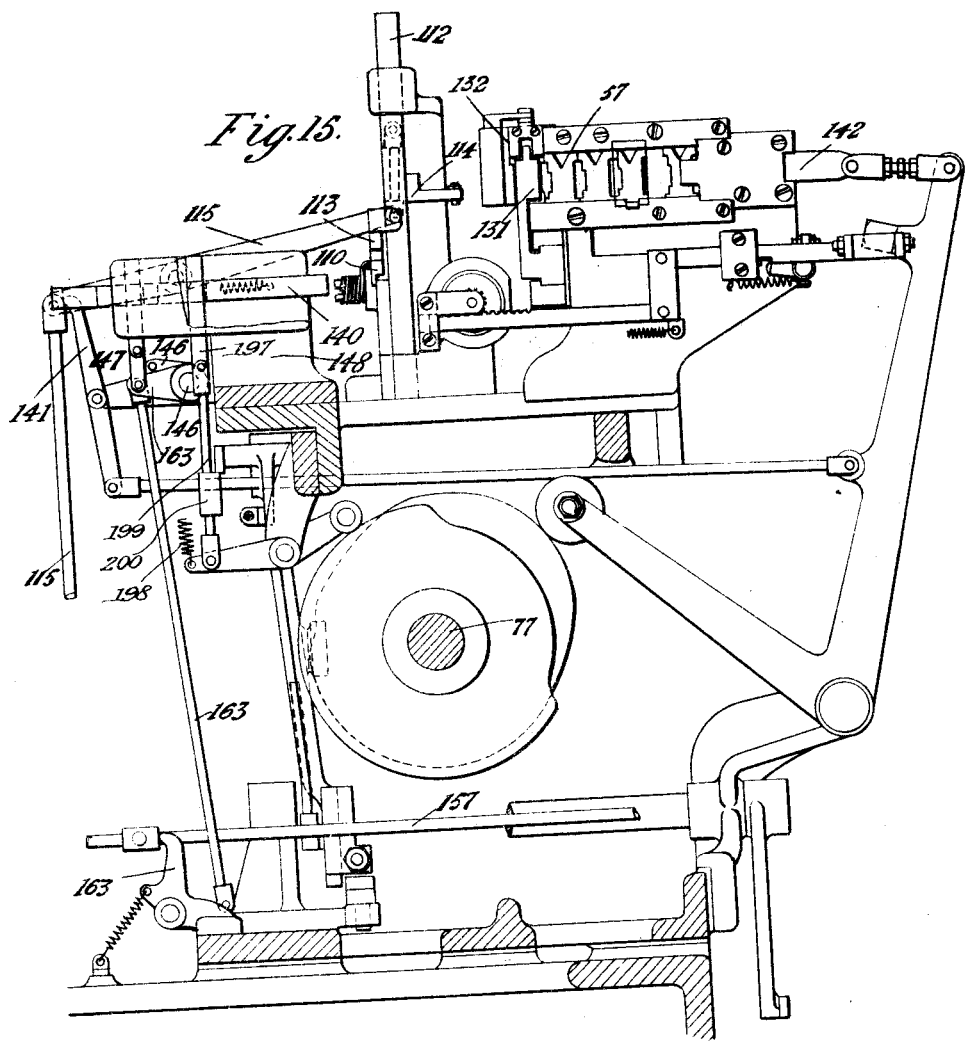

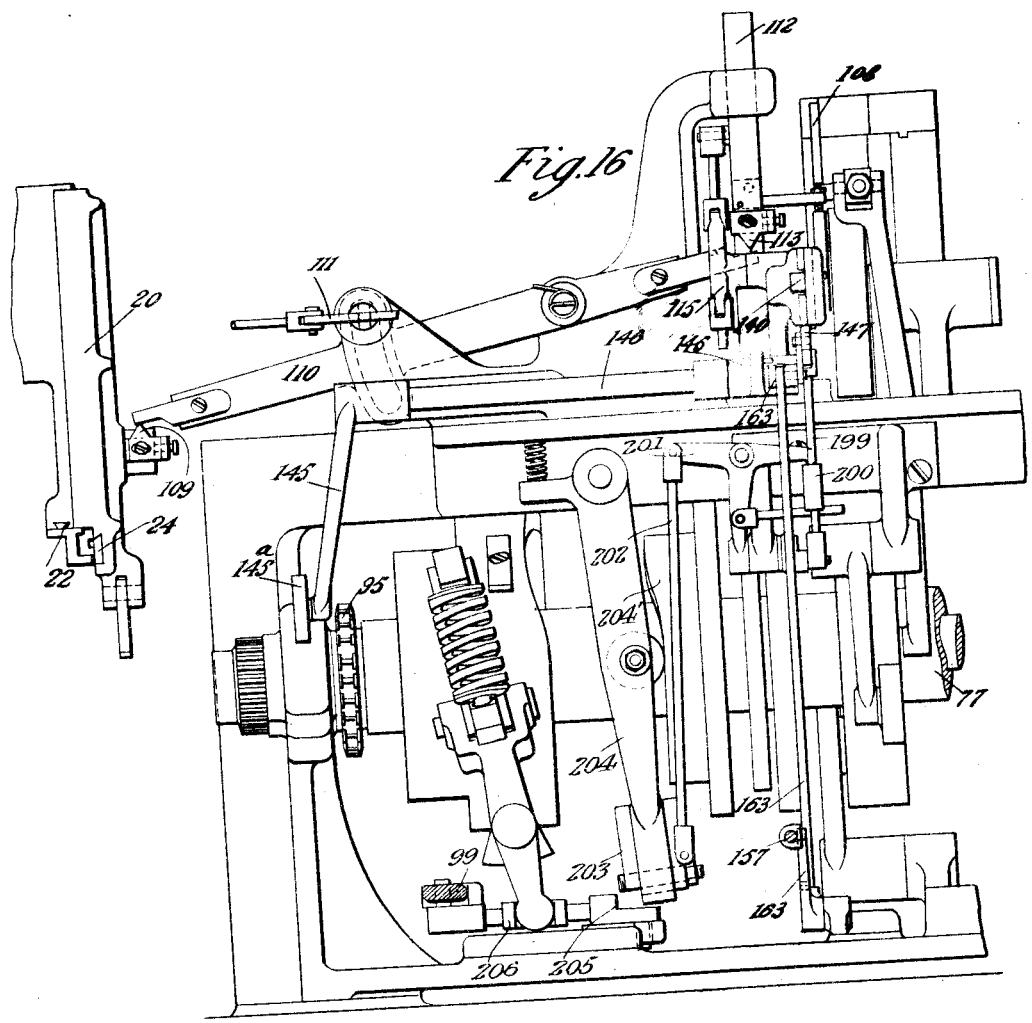

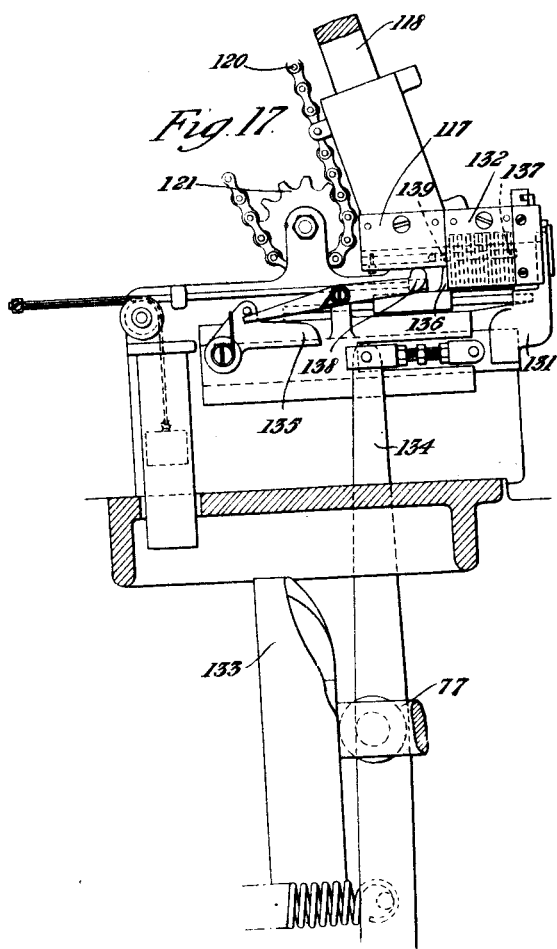

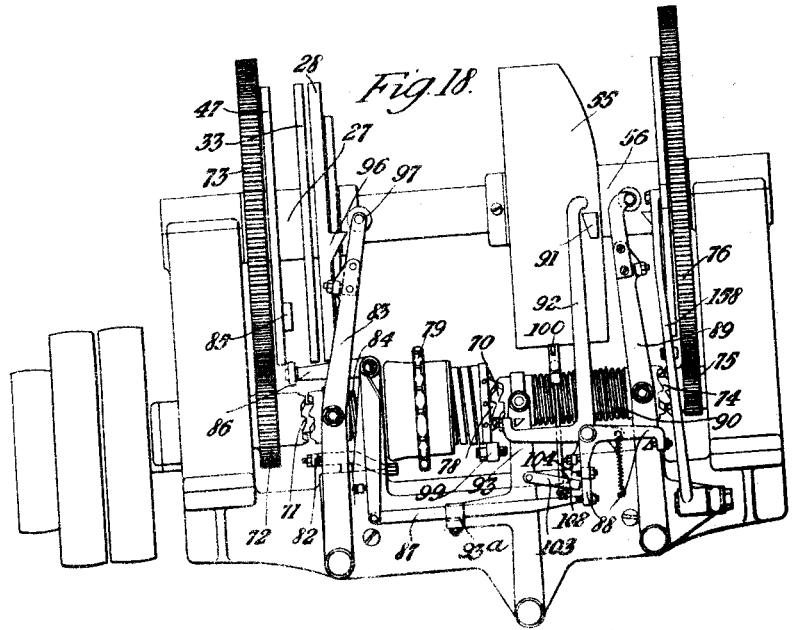
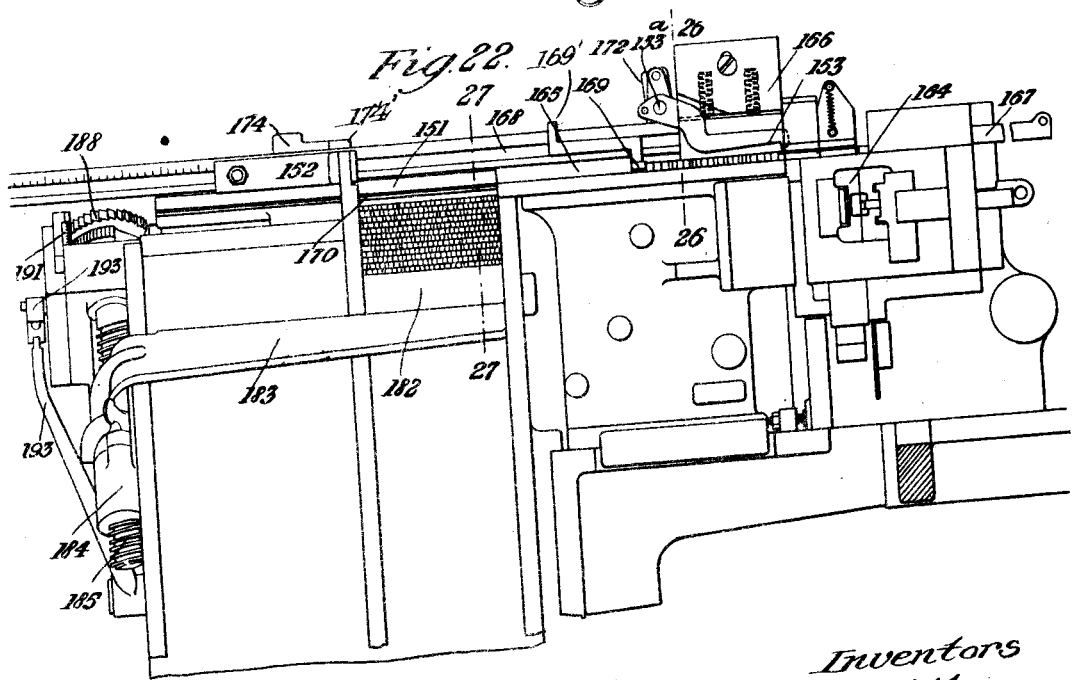

P. W. DRUITT & W. R. GILPIN.
TYPOGRAPHIC MACHINE.
APPLICATION FILED MAR. 13, 1914.
1,185,384.
Patented May 30, 1916.
18 SHEETS—SHEET 15.
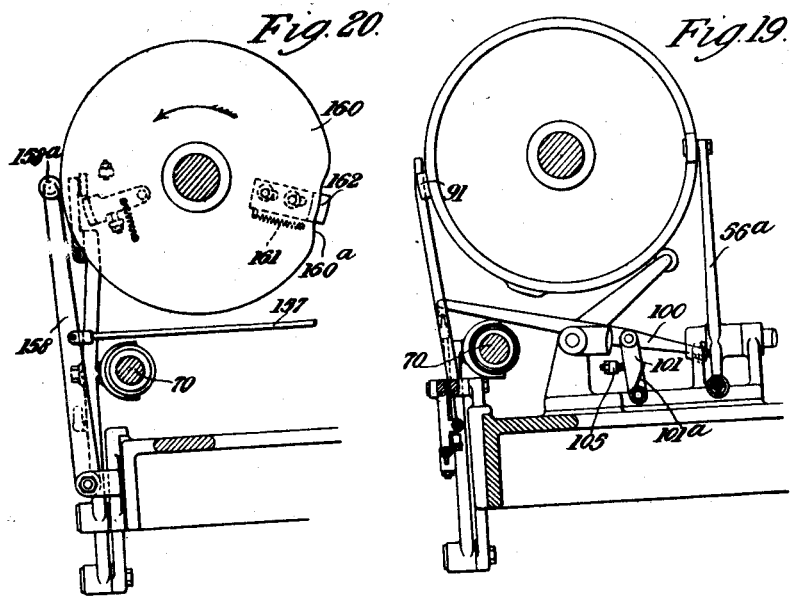
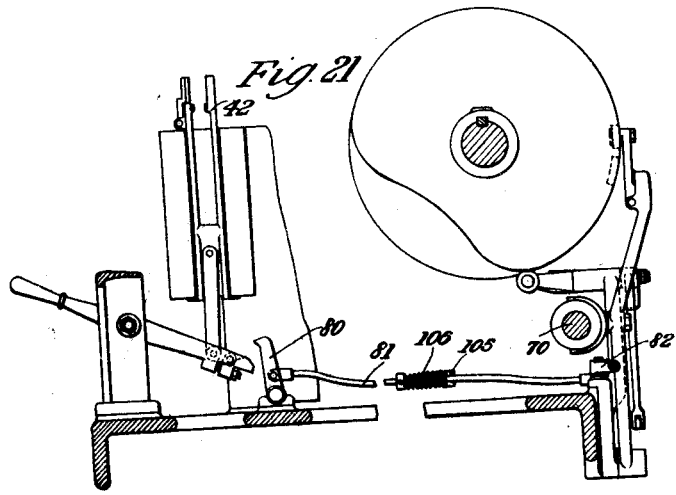

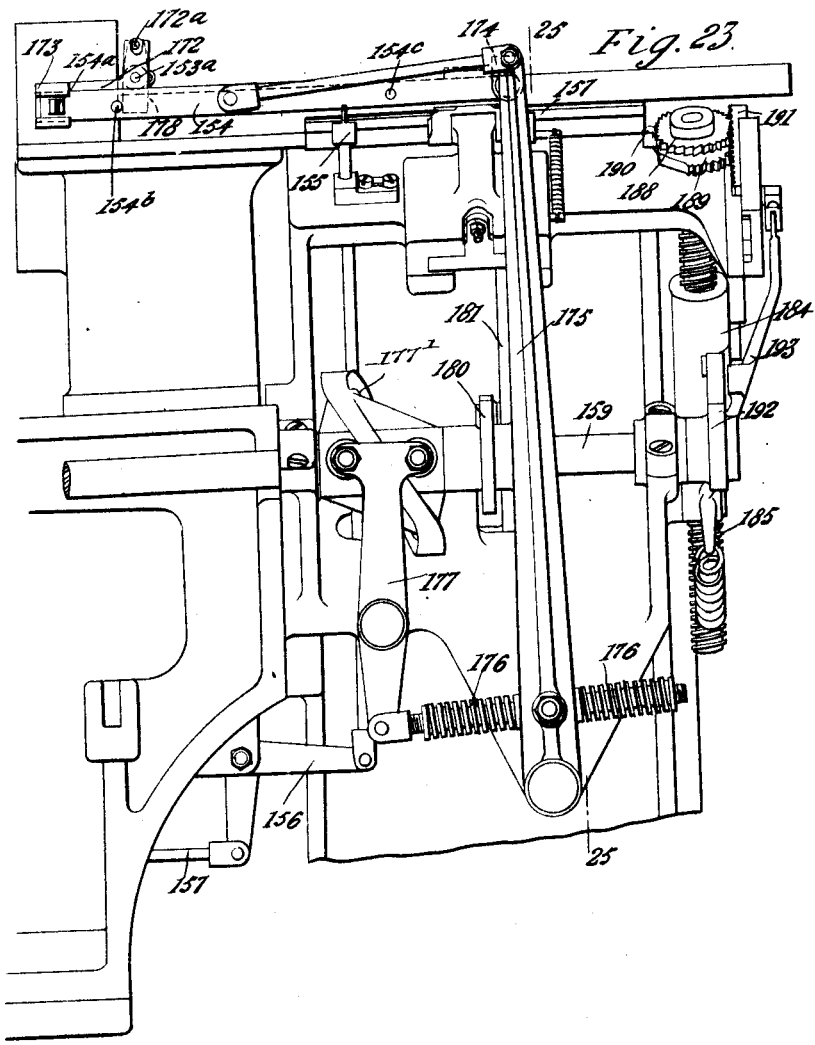

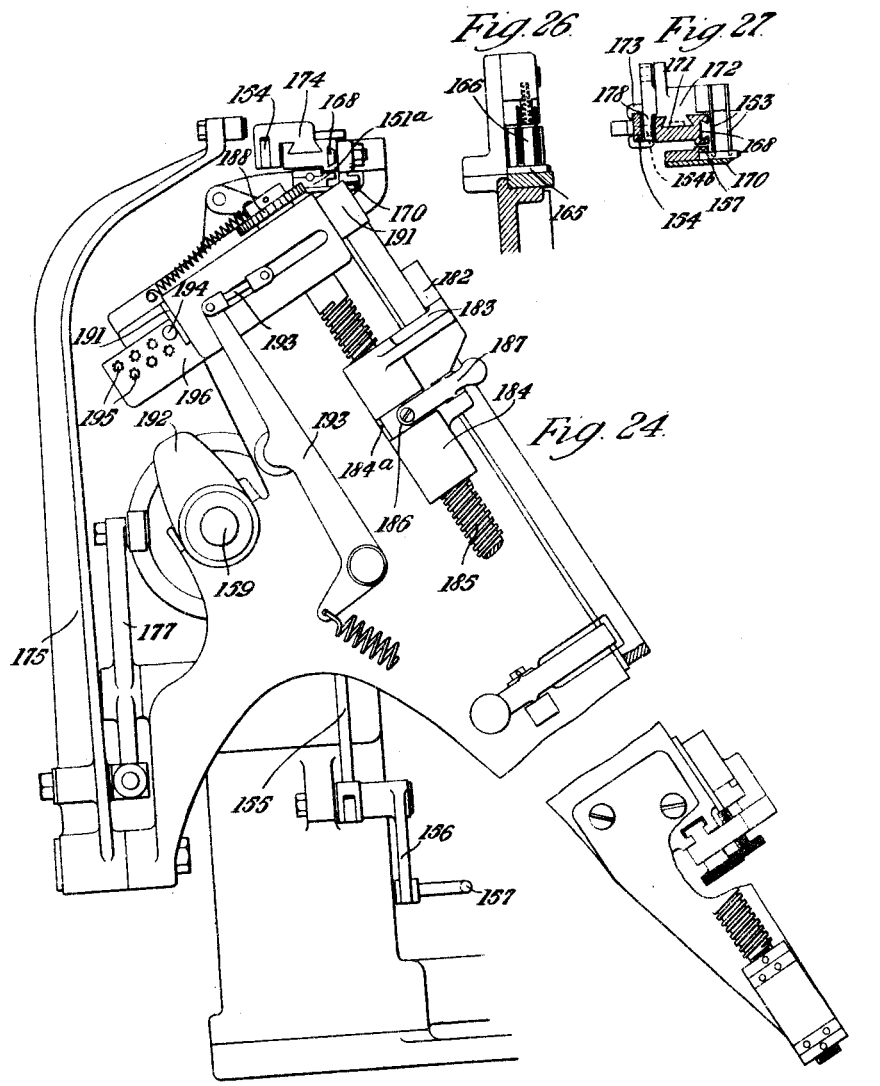

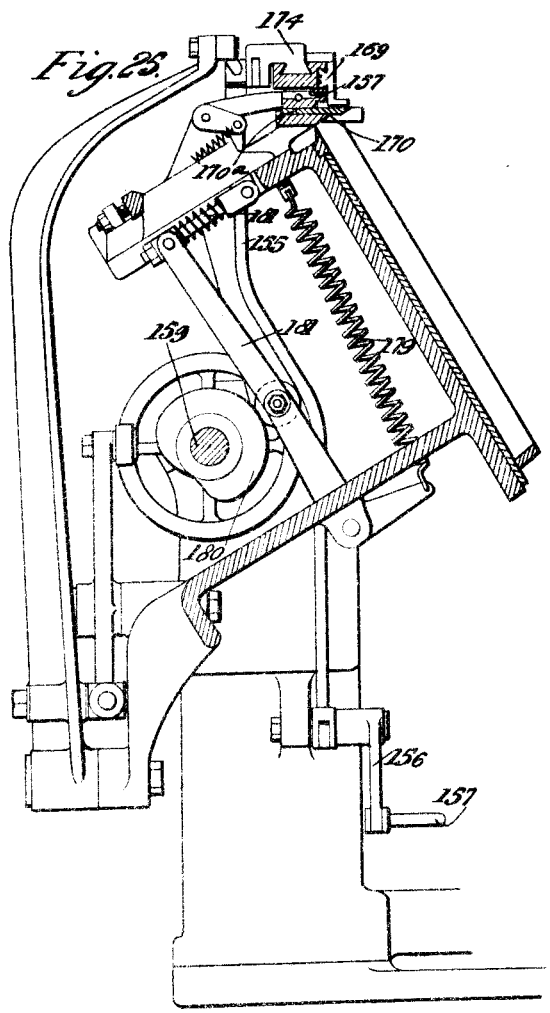

UNITED STATES PATENT OFFICE.

PERCY WALTER DRUITT AND WILLIAM ROBERT GILPIN, OF LONDON, ENGLAND, ASSIGNORS TO EDWARD HERON ALLEN AND ARTHUR FRANK DE FONBLANQUE, BOTH OF LONDON, ENGLAND.

TYPOGRAPHIC MACHINE.

1,185,384.  Specification of Letters Patent.  Patented May 30, 1916.

Application filed March 13, 1914. Serial No. 824,534.

*To all whom it may concern:*

Be it known that we, PERCY WALTER DRUITT and WILLIAM ROBERT GILPIN, both subjects of the King of Great Britain, both residing in London, England, have jointly invented certain new and useful Improvements in Typographic Machines, of which the following is a specification.

This invention relates to typographic composing machines and more particularly to those of the class, described for example in U. S. Patents Nos. 675,827, 675,828, and 675,829, all dated June 4, 1901, to Henry J. S. Gilbert-Stringer; U. S. application, Serial No. 647,059, filed August 31, 1911, by Henry J. S. Gilbert-Stringer, and in British Patent No. 15,468 of 1906, in which loose matrices contained in a magazine are assembled in line by means of a keyboard and a line of justified individual types produced therefrom, and the object of the invention is to increase the productive capacity of this type of machine, both as regards speed and range of work. Heretofore in machines of this class the matrices have been of varying but accurate thicknesses equal or proportional to the thickness of the type to be produced from them, and the thickness of the matrix has been used as one of the determining elements in justification.

In the improved machine which forms the subject of the present invention matrices of a convenient and uniform thickness, which need not be accurately determined, are employed irrespective of the set values of the characters represented by the matrices or the set width of the types cast therefrom, and consequently the thickness of the matrices is not a determining factor in the justification of the line.

The several improvements in the various parts of the machine which, in conjunction with the use of matrices of uniform thickness, serve to increase the capacity of the apparatus, will be herein described substantially in the order of the sequence of operations involved in the production of a justified line of individual types.

The magazine or magazines are formed with parallel slots of uniform width and spacing or pitch, the latter being equal to the spacing or pitch of the key levers in the keyboard mechanism, thereby effecting a saving in width of 33 per cent., as compared with present practice, at the top end of the magazine. Consequently the matrix holding capacity of the magazine can be increased considerably without increasing the dimensions of the machine and with a material decrease in the length of the distributer and magazine entrance.

The assembled line of matrices is transferred from the assembly box to an intermediate or waiting position during the period in which the casting of the preceding line is in progress, whereby a great saving in time is effected, since the operation of the casting shaft may be substantially continuous, the idle period being only that required to bring the waiting line of matrices to the separation position. Consequent upon this arrangement it becomes necessary to record upon an intermediate setting mechanism the dimension of the space necessary to effect the justification of the waiting line, so as to enable the justifying mechanism to be returned to its initial position to permit of the immediate assembly of the succeeding line. This space record is transferred to a justifying wedge associated with the mold during the period in which the waiting line is being transferred to the separating position and the casting shaft is stationary. Provision is also made whereby the casting mechanism may be brought into operation during the period in which the preceding line of type is being delivered to the galley.

The method of justification employed is a combination of the well known unit system of type sets and units recording mechanism, with an automatic proportional divider, also well known, whereby the shortage of the composed line is ascertained and divided equally between the word spaces in the line, but various novel features hereinafter described have been introduced into these mechanisms for the purpose of increasing their efficiency and range of usefulness and adapting them to the requirements of the improved machine.

To expedite distribution of the matrices and reduce the risk of emptying the magazine channels, means are provided for elevating small quantities of matrices (*i. e.* less than a full line) to the distributer at regular intervals. With this object the elevating cam shaft is geared directly with the casting shaft so as to revolve once for an integral number of revolutions of the latter, as for example 20. The re-assembly plunger is normally prevented from accomplishing its full travel toward the elevator so as to deliver the matrices from the separation channel to a raceway between this channel and the elevator. When the elevator is in position to receive the matrices from this intermediate raceway the re-assembly plunger is permitted to make its full stroke, thereby transferring the matrices in the intermediate raceway to the elevator.

The galley mechanism includes means whereby types may be transferred from the mold to a receiving raceway during the time in which the preceding line is being transferred to the galley. The means employed for effecting this are similar in principle to those used in certain existing machines for a like purpose, but several novel features hereinafter described have been incorporated in the mechanism.

It is occasionally necessary in the operation of type composing and casting machines to insert rarely used matrices by hand into the assembly box, and in such circumstances provision must exist for recording the unit set values of these matrices on the units counting mechanism. For this purpose additional finger keys are provided which act directly to release the eccentric carriages of the measuring stops of this mechanism whereby the stops are operated to record the number of units designated on the face of the manually inserted matrix. A separate key is provided for each stop, each key bearing the designation of the number of units represented by the corresponding stop.

While the actual mechanism required for carrying into practice the operations involved in the use of the mechanism herein-before referred to may take many forms, one complete system of mechanism will be hereinafter described, which accomplishes the purposes contemplated. Such an apparatus is illustrated in the accompanying drawings wherein—

Figures 1 and 2 are respectively a front and a side elevation of a complete machine embodying the present invention; Fig. 3 is a transverse section on line 3—3 of Fig. 1 but drawn on an enlarged scale and omitting the magazine and distributing mechanism; Fig. 4 is a sectional plan (with parts omitted) taken on line 4—4 of Fig. 2; Fig. 5 a front view of the justifying mechanism; Fig. 6 a transverse sectional view of same; Fig. 7 a sectional plan of part of same; Fig. 8 a transverse section through the keyboard showing the set value recording mechanism; Fig. 9 a part plan of same; Fig. 10 a part rear elevation showing the resetting mechanism; Fig. 11 a part front elevation showing the matrix transfer mechanism; Fig. 12 a transverse section on line 12—12 of Fig. 11; Fig. 13 a section on line 13—13 of Fig. 11; Fig. 14 a part plan view showing matrix transfer mechanism and part of the justifying mechanism; Fig. 15 a sectional side elevation showing part of the justifying mechanism and part of the safety stop mechanism; Fig. 16 a part rear elevation showing substantially the same parts as Fig. 15; Fig. 17 a rear elevation of the elevator and re-assembly box; Fig. 18 a rear elevation of the driving mechanism; Figs. 19 and 20 transverse sections of the apparatus shown in Fig. 18; Fig. 21 a part transverse section of part of the machine showing the relation of assembly box with the driving mechanism; Fig. 22 a part elevation of the galley mechanism; Fig. 23 a rear elevation of same; Fig. 24 a side elevation of same; Fig. 25 a transverse section on line 25—25 of Fig. 23; and Figs. 26, 27 are sections on lines 26—26 and 27—27 respectively of Fig. 22.

The matrix releasing mechanism is that common to typographic machines in which the action of depressing a key 1 sets into operation power-driven mechanism whereby a key rod 2 (Fig. 8) is lifted to effect the release of a matrix from the magazine 3. Not only, however, is it necessary that the striking of the key should do this, but also that the set value in units of the released matrix shall be recorded by the units counting mechanism 4 (Figs. 5 and 8). The unit which is preferred in apparatus according to the present invention is 1/20 part of the quad and the matrices may be of any one of 15 sets from 5 units to 20 units inclusive, No. 18 being omitted. For convenience the keyboard is divided into four groups (two of which are indicated by the two sets of grouping bails shown in Fig. 9), the keys in the first group representing matrices whose set values may vary from 5 to 10 units inclusive, those in the second group from 8 to 13, those in the third from 11 to 16 and those in the fourth from 14 to 20 units inclusive. This arrangement is found to be very flexible in permitting of the employment of fonts of type whose characteristics vary considerably, and in which matrices of the same designation would represent different set values. The set values of the keys in any group may be arranged in any order within the limits of the group. Thus, a key may represent any unit value within these limits and further this value may be changed by changing certain parts of the mechanism to be described later. Moreover, as it is desired to release matrices from either of two magazines and as the matrices in corresponding channels of the two magazines may be of different set values, provision is made whereby the touching of a key may record either of two different unit values according as the matrix is released from the upper or the lower magazine. To meet this requirement the vertical power-driven key rods 2 are each provided with two projecting lugs 5, 6 (Fig. 8) on their edges, one above the other, which coöperate with a series of horizontal units accounting levers 7, 8 extending in two tiers rearwardly of the key rods 2 and pivoted at their ends farthest from the key rods in such manner that the front ends of the upper tiers of levers 7 can engage the upper lugs 5 of the key rods, and the lower tiers of levers 8, the lower lugs 6. There is a pair of these levers, upper and lower, for each key rod and the levers on one tier are staggered relatively to those in the other tier so that while the levers in one tier are in engagement with the key rods and are operated thereby, the levers of the other tiers are out of engagement with the key rods.

Correlated with the magazines 3 is a change-over gear, which may be of the character shown in British Patent No. 10,832 of 1911 and comprising the sliding bars 207 which engage the escapement levers 208 and are moved in either direction by the three-armed lever 209 adapted to be turned by the rod 210 which may be shifted to engage one or other arm of lever 209 by means of the swinging frame 211 pivoted on the frame of the machine and controlled by mechanism including the rod 212 and hand lever 9 (Fig. 1). Means operated from the change-over gear of the magazines are provided whereby a guide comb 10 (Figs. 5 and 8) supporting and positioning the front ends of the levers 7, 8 may be moved transversely of the key rods 2 and against the action of a spring 213 (Fig. 5) to bring either upper or lower tier of levers into operation, according to the magazine which is being used. Such means may comprise a screw 214 which coöperates with a nut 215 (Fig. 5) fixed to the frame of the machine, and is capable of being turned in the nut by means of a rod or link 216 operatively connected with the change-over gear referred to above.

Each units accounting lever has an upwardly extending lug 7ª, 8ª respectively, and also at its rear end a series of six notches 11 whereby the lever may be adjusted by hand to fulcrum in any one of six different positions, and thus be rendered capable of engaging and lifting vertically any one of six horizontally mounted frames or grouping bails 14. There are four groups of these bails (two are shown in Fig. 9) corresponding with the four sections of the keyboard, each bail extending transversely of all the units accounting levers 7, 8 in its group.

Each bail represents a definite unit value and the upward motion imparted to it from the key rod through the units accounting levers is transmitted by means of transversely mounted levers 15 (Figs. 5, 8 and 9) through a power-driven mechanism to the corresponding measuring member 16 of the units registering device 4, whereby the units recording rack 17 is advanced an amount proportional to the set value of the matrix released. The transverse levers 15 which communicate motion from the bails 14 to the measuring members 16 may be adapted in some cases to receive motion from two bails in adjacent groups both representing the same unit value, by furnishing these levers with two lugs instead of one adapted to engage the side arms of both bails.

The units accounting mechanism is of known character and need not be herein described. Further, a power relay which is constructionally of generally known character and comprises the eccentric 18 and the power driven spindles or rollers 18' may, if desired, be interposed between the bails 14 and the measuring members 16 to relieve the key rods 2 of the strain of operating the units accounting mechanism and also to insure that the measuring stops 16 are maintained in an elevated position sufficiently long to insure the correct registration of the units. According to the present invention the eccentrics 18 (Fig. 8) of this known mechanism are released by the action of the bails 14 and on their upward power-driven stroke operate directly upon the ends of the measuring stops 16. The power-driven mechanism which operates the key rods 2 and comprises the eccentrics 217 and spindles or rollers 218 is driven from the power relay operating the measuring stops 16 by means of the gears 219 and connections 220 as shown in Fig. 5 so as to insure that no matrices will be released without their set values being recorded.

Should it be necessary to insert a matrix by hand, the unit set value of such a matrix is recorded on the units counting mechanism by depressing the appropriate key of a series of additional finger keys 1ª and thereby releasing the eccentric 18 of the measuring stop 16 corresponding with the key struck.

*Justifying mechanism.*—The units indicating rack 17, which is advanced toward the left by an amount corresponding with the growth of the line which is being assembled, moves always toward a fixed point which represents the end of the line, the length of which is determined by the extent of the retrograde movement of the rack during the re-setting operation. In the machine as herein organized the word spaces, during the process of composition, are given the minimum set value of 5 units, it being the function of the justifying mechanism to give the spaces such increase in set width as will fill the line out to the correct length. For this purpose the assembly of matrices is arrested at any convenient point before the indicator reaches the fixed point above referred to, provided the line is sufficiently long to come within the range of justification of the mechanism.

An automatic proportional dividing mechanism capable of apportioning the amount represented by the gap between the end of the indicator rack and the fixed point equally among the word spaces in the line, serves to give correct justification. This apparatus, which is of generally known character, comprises a series of inclined measuring plates or wedges 19 (Figs. 5, 6 and 14) each differing from its neighbor by the same arbitrarily selected difference, and each corresponding with a given number of word spaces. The plates are mounted side by side in vertical planes and are carried in a vertically moving justifying slide 20, each plate being capable of movement by this slide independently of the others in the following manner: The lower extremities or shanks 19$^a$ of the plates, which are of similar dimensions, are notched, these notches 19$^b$ forming a continuous groove running transversely of the plates when the latter are in their lower or normal position. Mounted transversely of the plates and slidable in a main supporting casting 21 (Fig. 7) is a slide 22 having a rib or rail 23 extending into the groove 19$^b$ formed in the shanks of the plates. This slide is connected with a space-registering device similar to that described in U. S. application Serial No. 647,059 above referred to, and is adapted to be advanced for each word space used in the line through a distance equal to the pitch of the inclined plates. A gap 23$^a$ is provided in the rib 23 of the slide 22 with two objects, (1) to permit the elevation of any one of the inclined plates 19 according to the number of word spaces in the line; (2) to move, by means of a tongue and groove connection, a sliding bar 24 mounted in the justifying slide 20. The lug or tongue 25 by which motion is transmitted from one slide to the other has a thickness slightly less than that of the inclined plates and passes directly beneath the shank of that plate which is left uncovered by the gap 23$^a$ in the rib 23. Any movement of the justifying slide 20 will carry this inclined plate with it, the other plates being held against movement by the engagement of the rib 23 with the notches 19$^b$ in the shanks of the plates.

Carried by the main supporting casting 21 and capable of being driven horizontally by the vertical movement of the inclined measuring plates 19 is a series of plates 26 corresponding in number with the measuring plates 19 and having inclined ends 26$^a$ engaging with the inclined edges 19$^c$ of the measuring plates. These horizontal plates 26, the angles of whose inclined ends 26$^a$ are the complements of the angles of the inclined edges 29$^c$ of the measuring plates with which they engage, may be adapted to move individually, or may be fastened together to form one sliding body, or they may be fastened together in groups to form a series of slides. The ends of the horizontal plates remote from the measuring plates form in the normal position of the justifying mechanism the fixed point toward which the units indicator rack advances in the process of composition.

On the completion of a line the operator sets a cam shaft 27 (hereinafter the first transfer cam shaft) in motion. A cam 28 (Figs. 3, 18) on this shaft, on being rotated permits the spring or frictionally urged justifying slide 20 to rise, carrying with it the selected measuring plate 19 until the horizontal plate 26 engaging therewith comes into contact with the end of the units indicator rack 17.

The vertical movement of the justifying slide is equal to the movement of the horizontal plate divided by the tangent of the angle of inclination of the selected measuring plate. Now the tangents of these angles are arranged in arithmetical progression, the tangent of inclination of No. 2 space measuring plate being twice that of No. 1 space plate, No. 3 space plate being three times that of No. 1, and so on. It is evident therefore that the vertical movement of the justifying slide is a direct measure of the quotient of the line shortage divided by the number of spaces, and represents the amount to be added to each space to give correct justification.

The pressure exerted upon the end of the units indicator rack 17 by the horizontal plates 26 during justification will vary according to the inclination of the particular measuring plate selected. In the case of the one unit measuring plate with its small angle, this pressure will be very much greater than in the case of the 20 units plate with its big angle. This variation in pressure may, owing to lack of absolute rigidity of the parts concerned, introduce errors in the measuring which will be prejudicial to correct justification. To overcome this, the horizontal plates 26 may, as before stated, be adapted to move independently of each other, each plate being urged into engagement with its coöperating measuring plate by a lever and spring. The springs may then be so adjusted as to make the resistance to movement of the plates proportional to the magnitude of the driving action of the measuring plates engaging with them. In the preferred construction it is deemed sufficient for practical purposes to group the plates by fastening them together to form say three slides, each group having its own independent lever 26^b and spring 26^c. A bar 29 is mounted transversely of the end of the indicator rack so that it may be engaged by any one of the three slides.

The means for controlling the adjustment of the mold from the justifying slide is closely connected with other features of this invention, and will be described therewith.

*The re-setting mechanism.*—As before stated, the units counting mechanism is regulated to suit different lengths of line by varying the extent of the retrograde movement of the units indicator rack. The units indicator rack 17 and with it the units wheel 4, is re-set to zero position on the completion of justification by means of a spring-urged re-setting lever 30 (Fig. 5) pivotally mounted on the main frame of the machine. One arm of the lever is adapted to engage with a pin 29^a projecting from the bar 29 at the end of the indicator rack, and another arm of the lever is urged by its spring into contact with a vertically mounted plunger 31, the lower end of which is coupled with a lever 32 (Figs. 3 and 6), which receives motion from a cam 33, known as the re-setting cam, on the first matrix transfer cam shaft 27.

Normally the spring-urged re-setting lever 30 is held in its retracted position by means of the cam lever 32 and vertical plunger 31, so that it does not interfere with the advancing movement of the rack 17 during composition. Immediately after justification the re-setting cam lowers the vertical plunger and allows the re-setting lever to encounter the pin 29^a in the rack 17 and urge it back against its spring or weight driven motor until it engages the zero stop 34, the spring 30^a operating upon the re-setting lever being sufficiently strong for that purpose. The vertical plunger always moves through its full travel and thus leaves the coöperating arm of the re-setting lever as soon as the indicator rack makes contact with its stop.

Adjustably mounted upon the vertical plunger 31 is a sleeve 35 (Figs. 5, 10) which is adapted to engage and displace laterally the upper end of a lever 36 pivoted horizontally at its lower end upon the justifying mechanism supporting casting 21. The lateral movement is transmitted from the sleeve to the lever through a latch 37 mounted on the end of the latter in such a manner that the movement of the lever only takes place during the downward movement of the sleeve. This lever 36 communicates its motion through the medium of a link 38 to the locking pawl 39 of the units wheel 4 so as to release the latter just prior to the retrograde movement of the rack 17, thus leaving the units wheel free to be moved thereby. The sleeve 35 is sufficiently long to hold the locking pawl 39 out of engagement with the units wheel 4 during the whole of the movement of the indicator rack 17 and as the downward movement of the plunger 31 continues after the indicator rack has reached its stop 34, the end of the sleeve 35 in due course passes its coöperating latch 37 and allows the locking pawl 39 to return into engagement with the units wheel 4, thus locking it in its zero position. The upward cam driven movement of the plunger 31 now returns the re-setting lever 30 and holds it in its retracted position.

The re-setting cam 33 and cam lever 32 are also utilized for the purpose of re-setting to zero position the space registering mechanism. A two-armed bell crank 40 is pivotally mounted on the justifying mechanism supporting bracket 21, and is spring-controlled so that one arm is forced into contact with the end of the re-setting cam lever 32, and is normally held in its retracted position thereby. The other arm of lever 40 is adapted to engage by means of a pin and roller 41 at its extremity with the end of the previously described slide 22 which is actuated by the space registering mechanism and the function of which is to select the appropriate measuring plate. Normally the bell crank 40 is held retracted to the full extent of the travel of the slide 22 from the latter's zero position indicated in broken lines in Fig. 6. Coincident with the re-setting of the units indicating rack 17, which occurs on the downward movement of the re-setting cam lever 32, the bell crank 40 is allowed to move under action of its spring to encounter the end of the slide 22 and drive it, together with the space registering mechanism, to the zero position. The positive return stroke of the re-setting cam lever 32 retracts the bell crank 40 to its normal position.

*Matrix transfer mechanism.*—The matrices are assembled in a vertically movable assembly box 42 (Figs. 1, 11, 13, 14). The advancing line of matrices acts against a yielding resistance or assembly abutment 43 which is slidably mounted on a guide bar 44 immediately below the assembly box channel, and fixed longitudinally thereof. On the completion of the assembly of a line of matrices the assembly box 42 is lifted vertically by hand. This action has the effect of withdrawing the line of matrices from the support of the assembly abutment 43 and placing it in the upper position, between a driving or transfer finger 45, hereinafter known as the first matrix transfer finger, at the rear end of the line, and a supporting finger, or transfer abutment 46 at the forward end of the line. The assembly abutment 43 in the meantime, being released by the removal of the matrices, has returned under the influence of its impelling weight to its original position, preparatory to the assemblage of a new line.

The manual elevation of the assembly box serves to set in motion the first matrix transfer cam shaft 27, in a manner to be hereinafter described. A cam 47 (Fig. 18) on this shaft, hereinafter known as the first matrix transfer cam, acts through suitable linkage connected with the first matrix transfer finger 45 to transfer the line to a race-way 48, hereinafter known as the matrix transfer raceway, to the left of and in line with the assembly box 42, when the latter is in its upper position.

A pair of latches 49 mounted in the walls of the transfer raceway 48 engages with the last matrix of the line, and serves to retain the line in a stationary position after the first matrix transfer finger 45 has been withdrawn and returned to its original position, in readiness for the transfer of the next line. The line of matrices supported in front by the transfer abutment 46 and at the rear by the latches 49, now occupies what is known as the waiting position. The assembly box 42 which is held in its elevated position by a latch 50 during the transfer of the line, is released by the engagement of the first matrix transfer finger 45 with the latch 50 at the moment when the matrices have cleared the box 42, and is now free to descend by gravity to its normal position.

It is not of the principal features of this invention that a line of matrices may be transferred to the waiting position during the period in which the previously assembled line is being separated and dealt with by the casting mechanism. For this purpose the matrix transfer raceway 48 is made of sufficient length to accommodate two lines, one of which indicated at 51 (Figs 1, 11, 14) will occupy the waiting position at the right hand end of the raceway, and the other indicated at 52 the separating position at the left hand end.

The operations of separation, presentation to the mold, and casting, are carried out substantially as described in the above cited patents and need not be described here.

The second matrix transfer finger 53 (Figs. 11, 12, 14) which urges the matrices forward step by step during the process of separation is also utilized for the purpose of transferring the line of matrices from the waiting to the separating position. This finger is constructed and described in British Patent specification No. 15468 of 1906, being pivotally mounted on its slide 54 and capable of being raised vertically at the commencement of its rearward travel to clear the matrices 51 behind it and of being lowered at the commencement of its forward travel to engage with the matrices.

The second matrix transfer finger 53 is driven through suitable linkage by means of a cam 55 (Fig. 18) on the second matrix transfer cam shaft 56. Should there be a line of matrices in the waiting position, the second matrix transfer shaft 56 will be automatically put into operation immediately on the completion of the separation and casting operations so as to bring the waiting line into the separating position without loss of time. Should, however, there be no waiting line, the second matrix transfer shaft 56 will remain inoperative until the completion of the next cycle of the first matrix transfer shaft 27, which shaft, as previously explained, carries the first matrix transfer cam 47 which operates to put a line into the waiting position. In the latter event also the bringing into operation of the second matrix transfer shaft is automatic and is consequent upon the movement of the first matrix transfer cam shaft. It must be understood, however, that should the casting shaft be in operation at the time when the first matrix transfer shaft 27 performs its cycle, the latter will not on the completion of its movement operate to start the second matrix transfer shaft 56. The mechanism whereby these results are accomplished will be hereinafter described in connection with the clutch and driving mechanism.

To support the line of matrices in its transit from the waiting to the separating position, the same transfer abutment 46 that supported the line during the first transfer movement is made use of. In order that the abutment may be withdrawn from in front of the line of matrices just prior to reaching the separation channel 57, (Fig. 15), the abutment slide 46 is mounted upon a guide bar 58 (Figs. 11–14) which is pivoted at 58' in a horizontal plane at its end farthest from the separation channel 57.

Normally the free end of the guide bar 58 is urged upward by means of a spring 59, portions only of which are indicated in Fig. 11, the bar being held in its horizontal position by a two-armed latch, one arm 60 of which engages a pin 61 projecting from the bar 58. At an appropriate point in the travel of the transfer abutment 46 to the separating position a lug 46$^a$ on the transfer abutment serves to depress the other arm 62 of the latch, and thus releases the guide bar 58, which thereupon flies upward taking the abutment 46 clear of the line of matrices. The abutment, under action of its restoring weight or spring, immediately returns to a position in which it will be in readiness to coöperate with the next line to be transferred from the assembly box 42. This position is determined by a stop 63 fixed to the frame of the machine, which stop the abutment 46 encounters when the bar 58 is in its elevated position, and thus holds the abutment 46 at such a distance from the first matrix transfer finger 45 as will permit of the introduction of the longest permissible line between them. The release of this stop 63 to allow the transfer abutment to close on to the line of matrices, and the restoration of the guide bar 58 to a horizontal position are accomplished as follows: The first matrix transfer lever 64 is extended at its lower end to engage one end 65 of a bell crank, the other end 66 of which is connected with a sleeve 67 slidably mounted on a link 68 attached to the guide bar 58. The first matrix transfer cam lever 64 having returned the transfer finger 45 to its zero position against a stop 69, receives additional travel the effect of which is to compress the spring 59 on the link 68 and force the bell crank to the right, thus compressing the spring, which as before described, tends to urge the guide bar 58 in an upward direction. The first matrix transfer lever 64 on its forward movement therefore, prior to shifting the transfer finger 45, releases the bell crank and allows the spring 59 to expand and the guide bar 58 to fall under its own weight to its horizontal position and in consequence carry the abutment 46 clear of the stop 63.

*Clutch and driving mechanisms.*—The first matrix transfer group of cams and the second matrix transfer group of cams are both mounted upon axially alined shafts 27, 56 but receive their motion independently of each other from a common driving shaft 70 (Figs. 2–4, 18–21) located beneath them. The first matrix transfer cam group receives its motion through the medium of a claw clutch 71 and pinion 72 on the driving shaft 70 and a spur gear 73 on the cam shaft 27, and the second matrix transfer cam group receives its motion through a similar mechanism 74, 75, 76. The same driving shaft 70 also gives motion to the casting shaft 77, and for this purpose carries a third clutch 78 with a chain sprocket wheel 79. The action of the clutch mechanisms can be studied more easily by following the progress of a line of matrices through the machine, assuming first of all that this line is the first line of a job, and that the machine is otherwise empty.

The manual elevation of the assembly box 42 serves to displace a lever 80 (Fig. 21) the movement of which is communicated through a link 81 to a latch 82 so as to effect the release of a clutch lever 83 which, under the influence of a spring 84, operates to put the clutch members 71 into engagement, and so set the first matrix transfer group of cams in motion. This effects the justification and first transfer of the matrix line, and on the completion of the transfer movement a lug or projection 85 on one of the first matrix transfer group of cams operates to displace the end of a lever 86 which transmits its motion to a link 87 and the latter, in the circumstances alluded to, operates to trip a latch 88, thereby releasing a clutch lever 89 which, under the action of a spring 90, operates to put the clutch members 74 into gear to start the second matrix transfer group of cams. This effects the transfer of the line to the separating position. Upon the completion of the latter movement, a lug 91 on one of the second matrix transfer groups operates to displace one arm of a latch 92, the other arm thereupon releasing a clutch lever 93 and allowing it, under action of a spring 94 to actuate clutch 78 and put into operation the sprocket wheel 79 which communicates motion through a chain wheel 95 to the casting shaft 77.

It will be seen that although two independently moving cam groups have been utilized for the complete transfer of the line of matrices, yet the movements of the two groups are so correlated that the line of matrices passes through the two periods of first and second transfer and is delivered to the casting mechanism without loss of time.

At the end of the revolution of the first matrix transfer cam group a lug 96 mounted on one of the cams operates on a roller 97 on the extended arm of the clutch lever 83 which controls the first matrix transfer group of cams and positively forces the clutch 71 out of engagement; the cooperating latch 82 retaining it in this position. A similar action occurs to stop the motion of the second matrix transfer cam group on the completion of one revolution.

The casting shaft clutch 78 is disengaged on the completion of the casting operations by the positive movement of a lever 99 (Figs. 4, 18) which receives its motion from the casting shaft in a manner substantially the same as described in British Patent specification No. 15468 of 1906 and as hereinafter referred to in the description relating to the operation of the safety stops.

Should the casting shaft 77 be in operation when a line is transferred from the assembly box 42, the movement of the assembly box will start into operation the first matrix transfer cam group and the operations of justification and first matrix transfer will take place as before.

The link 87 previously referred to, controlling the operation of the second matrix transfer group of cams, is guided in and supported by an arm 93ª of the clutch lever 93 which controls the operation of the casting shaft 77. In the position in which the casting shaft clutch 78 is disengaged, this link 87 is raised into the position in which it engages with the end of the coöperating latch arm 88, to operate the latter with the result previously described. When the casting shaft is in operation the arm 93ᵃ of the clutch lever which supports the link 87 is lowered, and the end of the link is clear of the coöperating latch arm 88. In these circumstances the first matrix transfer cam group will come to the end of its movement without putting the second matrix transfer cam group into operation. Thus, the line will be left in the waiting position to await the completion of the casting operations. The starting of the second matrix transfer cam shaft is now effected on the completion of the casting operations; the movements of the casting shaft clutch levers 93 and 99 on the completion of the casting operation as hereinafter described, being utilized for this purpose.

In British Patent specification No. 15468 of 1906 mechanism is described which operates to disengage the clutch of the casting shaft in the event of a matrix becoming jammed in the separation channel. As this mechanism is in use on the machine as now organized, it is necessary to distinguish between a stoppage of the casting shaft due to these circumstances and that due to the completion of the casting of the line. The position of the cam lever 56ᵃ (Figs. 2, 4, 19) which effects the movement of the second matrix transfer finger 53 affords a convenient means for accomplishing this, as it will be seen that the latter only attains its extreme left hand position on the completion of the separation of the line of matrices. Therefore a lever 100 is provided which is pivoted on the end of a swinging link 101 and has one arm extended beneath an arm of the second matrix transfer cam lever 56ᵃ, so as to receive motion from the latter when the last matrix in the line has been separated. At the other end of the lever 100 which, for distinction, will be called the floating lever, there is attached a link 102 which at its lower end is connected with a bar 103 one end of which is pivoted to the casting shaft clutch lever 93. In the normal position of the floating lever 100 the bar 103 falls clear of an adjustable screw 104 on the latch arm 88 which coöperates with the clutch lever 89 of the second matrix transfer group of cams, but when the lever 100 is operated upon at the end of the line by the second matrix transfer cam lever 56ᵃ the bar 103 is brought up opposite the end of the screw 104 on the latch arm 88, so that the movement to the right of the transfer cam lever 56ᵃ of the second matrix transfer group of cams consequent upon the unclutching of the casting shaft 77 will operate through the bar 103, screw 104 and latch 88 to release the clutch lever 89 and so start the movement of the second matrix transfer shaft. As will be understood from previous explanations, the movement of this mechanism to effect the starting of the second matrix transfer cams, on the completion of the separating operations, must only take place when there is a waiting line. For this purpose a lever 105 (Figs. 4, 21) is pivotally mounted on a casting adjacent to the casting shaft clutch actuating lever 99. One end of this lever 105 receives motion through a cushioning spring 106 from the link 81 which controls the first matrix transfer clutch lever 83. On the other arm of the lever 105 is mounted a latch 107 which, by coöperating with a stop 99ᵃ on the casting shaft clutch actuating lever 99, operates to hold the lever 105 in the position in which it will be placed by the forward movement of the link 81, consequent upon the elevation of the assembly box 42. It is to be observed, however, that the lever 105 will only be retained in this position when the casting shaft clutch lever 99 is in its left hand position, corresponding to that in which the casting shaft clutch 78 is in engagement. One end of the lever 105 engages the side of the swinging link 101 on which the floating lever 100 is fulcrumed, so that the previously described movement of the lever 105 will operate to move this link against its spring 101ᵃ in the direction in which it will carry the end of the floating lever 100 into engagement with the coöperating arm of the second matrix transfer cam lever 56ᵃ.

From the foregoing description it will be seen that the bar 103 will only operate to start the second matrix transfer shaft 56 as the result of the combination of the two following circumstances, viz. the act of operating the assembly box to transfer a line while the casting shaft is still in operation, and the throwing out of the casting shaft clutch consequent upon the separation of the last matrix in the line.

*Setting the mold justifying wedge.*—The adjustment of the mold to give the correct justifying space is effected by means of a wedge 108 (Figs. 14 and 16) and the mechanism for putting this wedge into and out of coöperation with the mold according to whether a character type or a justifying space is required, is substantially the same as that described in U. S. Patent No. 647,059. The wedge 108 is locked in its adjusted position just prior to, and remains locked throughout, the movement of the casting shaft 77, as described in the above mentioned specification. As it is possible in the improved machine to have at one and the same time a line in process of casting, another line in the waiting position, and a third line being assembled, it is evident that means must be taken for preserving the justification value of the waiting line and for transferring this value to the casting mechanism simultaneously with the transfer of that line to the casting mechanism. For this purpose the upward justifying movement of the justifying slide 20 is transferred through the medium of a knife edge 109 to the end of a lever 110 pivoted at a point between its two ends, and extending transversely across the machine from the justifying mechanism toward the mold. This transverse lever 110, hereinafter called the justification control lever, is locked in the position given to it by the justifying slide by means of a wedge 111 or a screw or other suitable locking mechanism actuated through suitable linkage from a cam of the first matrix transfer group of cams. After the locking operation the justifying slide 20 is returned to zero position in readiness for the justification of the succeeding line, the justification value, indicated by the height to which it had risen, having been transferred to the justification control lever 110. A vertically movable slide 112 (Figs. 14, 15, 16) is mounted in a casting adjacent to the other end of the justification control lever 110 and carries on one of its sides a knife edge 113 which is adapted to engage with the end of the justification control lever 110 upon the downward movement of vertical slide 112. A lug 114 projecting from another side of the vertical slide 112 is adapted to engage with the top of the mold justifying wedge 108 under similar circumstances. Normally the vertical slide 112 is maintained in its extreme elevated position against the action of a spring by means of a cam on the second matrix transfer shaft and suitable linkage 115 (Figs. 2, 14, 15, 16). The operation of the various parts is as follows:—Upon the movement of the second matrix transfer shaft 56 a cam thereon, through suitable linkage, operates to unlock the mold justifying wedge 108 which, under the influence of a spring 108' acting through a lever 108² bearing upon the slide 108³ of the mold wedge 108, rises until it encounters the coöperating lug 114 on the vertical slide 112. The further movement of the cam shaft 56 permits of the downward movement of the vertical slide and with it—the mold justifying wedge 108 under the action of a spring which is strong enough to overcome that of the mold justifying wedge. The downward movement continues until arrested by the contact of the knife edge 113 on the slide 112 with the end of the justification control lever 110. While in this position the mold justifying wedge 108 is locked in the same manner as the mold justifying wedge shown and described in the above cited British patent, and subsequent movement of the cam shaft 56 returns the vertical slide 112 to its elevated position, the justification value indicated by the position of the justification control lever 110 having been transferred to the mold justifying wedge 108. The justification control lever is unlocked at the commencement of the next revolution of the first matrix transfer shaft 27 and the end which engages with the knife edge 109 on the justifying slide 20 is spring-urged downward until it makes contact therewith to receive another setting.

*The elevator.*—As before stated, the elevator according to this invention has its movements controlled from the casting shaft 77 through a cam shaft 116 (Figs. 2, 3) which makes one revolution for a given number of complete revolutions (say 20) of the casting shaft. The elevator consists of a small box 117 (Figs. 3, 14, 17) of just sufficient length (for the gear ratio given above) to accommodate 20 matrices, and is slidably mounted upon a single rectangular guide bar 118, shown also in Figs. 1 and 2. The elevator guide bar is vertical in one place, but is inclined transversely of the machine in a direction toward the lift box 119 of the distributer, the lift box in this case being considerably shortened. The elevation is effected by means of an endless chain 120 (Figs. 1, 17) which passes over guide sprockets 121 one at each end of the elevator. The chain is driven by means of a sprocket 122 (Figs. 1, 3) which engages with the rear side of the chain at a point about midway between the two ends of the elevator guide bar. The sprocket receives motion from the elevator cam 116ᵃ by means of a pinion 123 fixed co-axially with the sprocket, a rack 124 meshing with the pinion, a lever 125 connected to the rack by means of a link 126 and a cam lever 127 mounted co-axially with the rack lever 125, and driving the latter through the medium of a buffer spring 128. The matrices are transferred from the elevator box 117, when in its upper position, to the lift box 119 by means of a slide 129 (Fig. 2) and finger 130 actuated by means of suitable linkage from a cam mounted co-axially with the elevator cam 116ᵃ. The re-assembly plunger 131 (Figs. 15, 17), the function of which is to re-assemble the matrices in line after separation and casting and prior to elevation, normally delivers the matrices one by one into a raceway 132 in line with and between the elevator and the separation channel 57. At every twentieth stroke the re-assembly plunger, however, takes the matrices right through the intermediate raceway 132 into the elevator, the movement of the elevator and the re-assembly plunger being so correlated that the elevator will be in position to receive the matrices. For this purpose the path of the re-assembly cam 133 on the casting shaft 77 is of such a depth as to permit of the plunger 131 traveling right through to the elevator. The re-assembly cam lever 134, however, which is spring-impelled in the re-assembling direction, is normally arrested by means of a stop 135 so located that the matrices are delivered just inside the intermediate raceway 132. The matrices are delivered against a weight-driven abutment 136 (Fig. 17) and a pair of latches 137 at the entrance of the intermediate raceway 132 serves to keep the matrices from following the re-assembly plunger 131 when the latter is retracted. The elevator, upon the completion of its downward travel, displaces the end of one arm of a lever 138, the other arm of which operates to withdraw the stop 135 from the path of the re-assembly cam lever 134. The latter on its succeeding stroke will therefore go through the whole of its travel, thus driving the matrices into the elevator. A pair of latches 139 in the elevator walls serves to prevent the matrices returning with the re-assembly plunger. The elevator immediately rises, thus freeing the abutment 136 and returning the stop 135 into the path of the re-assembly cam lever 134, preparatory to the re-assembly of the next batch of matrices. It will be understood that there is no interruption of the casting operations for the purpose of conveying the matrices to the elevator and thence to the distributer as is the case in all previous machines of this description.

*Safety stops.*—Various safety stops are disclosed in British Patent No. 15,468 of 1906 and in U. S. application, Serial No. 647,059, above referred to, the functions of which are to disengage the clutches and stop the machine in the event of the faulty operation of the parts to which they are applied. Although, according to this invention, the main principle of these safety stops is still adhered to, yet various modifications in the mechanisms employed have been made to adapt them to the changed conditions of working in the new machine.

The safety stop formerly controlling the operation of the separating mechanism consisted of a notched horizontal bar suitably guided and connected through linkage with the separation plunger so as to move therewith. A vertical bar, also notched or having a projecting lug, was mounted transversely of the horizontal bar and connected with a cam lever by means of a link. A similar mechanism comprising horizontal and vertical bars, linkage and cam was applied in a similar manner and for the same purpose to the type pusher mechanism. According to the present invention the duplicate set of mechanisms enumerated is replaced by a single set, the single horizontal bar 140 (Figs. 14, 15) being now spring-urged into contact with a lug on the type pusher cam lever, and also with the end of a lever 141 receiving motion from the separation plunger 142. The improper action of either of these mechanisms operates through the common horizontal bar 140 to bring about the stoppage of the machine. Improper action of any mechanism connected with bar 140 or the interruption of the action of the separator plunger due to the second matrix transfer finger 53 entering its path consequent on the separation of the last matrix will prevent the bar 140 accomplishing its full travel and will allow the bar 197 to move upward, under the action of a spring 198, through the opening in bar 140 exposed to it by reason of the shortening of its travel. This upward movement is communicated by means of a link 199, tappet piece 200, bell crank 201, link 202 to a block 203 slidably mounted on the end of a constantly reciprocating lever 204 which receives its movement from a cam 204' on the casting shaft and in such a manner as to throw the block 203 into the path of an abutment 205 on a link 206 connected to the clutch throw-lever 99 (Figs. 3, 4 and 16). The ensuing movement of block 203 and lever 204 will, through lever 99 and lever 93, positively disengage clutch 78. It is obvious that the horizontal bar may also coöperate with other mechanisms in a similar manner, and for the same purpose. Advantage of this fact is taken in connection with the safety stops applied to the elevator and galley mechanism in a manner to be now described.

As the elevator mechanism is geared to the casting shaft 77, the safety stop controlling the elevator must be adapted to disengage the clutch of the casting shaft and bring the latter to rest. The safety stop is further adapted to arrest the movement of the casting shaft, should the elevator become jammed in either its upper or its lower position. For the purpose of applying the safety stop to the upper position of the elevator, a treadle 143 (Fig. 3) is mounted on the elevator cam 116ᵃ on the elevator shaft in such a manner that one end of it projects into the path of that cam at the commencement of the downward movement. The depression of this treadle, due to the proper descent of the elevator and the consequent pressure of the roller 127ᵃ of its cam lever 127 on the path of the cam, serves to displace a trip lever 144 hinged on the cam and driven thereby. The displacement of the trip lever is in a direction out of the path of a roller 145ᵃ mounted on the end of a lever 145 fulcrumed on the frame of the machine and hereinafter called the transmitter lever. Should the elevator become jammed in its upper position, the cam lever 127 will be arrested in its movement and the roller on this lever will not press upon the falling path of the cam to depress the treadle. The trip lever 144 will in this case remain in the path of the transmitter roller 145ᵃ and the subsequent movement of the cam will, through the trip lever and transmitter roller displace the transmitter lever 145. The movement of this lever is transmitted through suitable linkage 146 (Figs. 14, 15, 16) to a slide 147, vertically mounted in the separation safety stop bracket 148, in such a manner as to intercept in its movement the previously mentioned horizontal safety stop bar 140, and thus bring about the stoppage of the casting mechanism.

To effect the stoppage of the casting shaft 77 due to the jamming of the elevator and its consequent failure to rise from its lower position, the rack driving lever 125 is provided with an arm 125ᵃ carrying a roller 125ᵇ at its end. It will be seen that in the event of the elevator becoming jammed in its lower position, the lever 125 will remain stationary, the spring connection 128 between it and the cam lever 127 permitting of the movement of the latter which is positively driven by means of the cam 116ᵃ on the elevator shaft 116. Mounted on the cam body and with an end in the path of the cam is a second treadle 149 (Fig. 3) similar to the axle 143 and connected with a second trip lever 150, the latter being adapted to operate upon the transmitter lever 145 in a similar manner to that described in connection with the first trip lever 144. Should the rack driving lever 125 remain stationary due to the jamming of the elevator, its arm 125ᵃ will, consequent upon the subsequent movement of the cam 116ᵃ, operate to depress the second treadle 149 and to throw the second trip lever 150 into the path of the transmitter roller 145ᵃ to stop the casting shaft 77. Should the elevator move properly, the arm 125ᵃ on the rack driving lever 125 will move clear of the treadle 149, and the trip lever 150 which in this case lies normally clear of the path of the transmitter roller 145ᵃ, will not actuate the latter, and the casting shaft will therefore continue its movement.

In British Patent specification No. 15468 of 1906 a mechanism is described for effecting the stoppage of the galley shaft in the event of a line of abnormal length being presented to the galley. In the present invention means are provided whereby the presentation of such a line to the galley will operate to stop both the galley and the casting shafts. For this purpose the following means are employed:—The line of types is delivered to a position immediately below the galley pusher 151 (Figs. 22–25) against a fixed stop 152 by means of a delivery finger 153. The position of the delivery finger, when the line is arrested by the stop, affords a direct measure or indication of the length of the line. Should the type delivery finger 153 in these circumstances assume a normal position due to the delivery of a line of normal length, the finger will, by means of a projection or lug 154ᵃ on the driving bar 154 of the finger, arrest the movement of a vertically mounted slide or plunger 155.

The plunger 155 is connected by means of a bell crank 156 and link 157 (Figs. 15, 20) with a cam lever 158 (Fig. 20) bearing on its end a roller 158ᵃ which engages with the path of a cam 160 in the second matrix transfer cam group. It is to be understood that the galley shaft 159 (Figs. 23, 24, 25) is geared to the second matrix transfer shaft 56 in such a way as to move synchronously with it. The movements of the two shafts are so correlated that immediately upon the completion of the delivery stroke of the type delivery finger 153, a depression 160ᵃ in the cam will come opposite the roller 158ᵃ. The lever 158 is spring-urged in the direction in which the roller will fall into this depression, but should the line of types delivered be of normal length such movement of the lever will be prevented, owing to the arresting of the plunger 155 in the manner previously described. Should the line of types be of abnormal length, the plunger will not be arrested in its movement, with the result that the roller 158ᵃ will be permitted to drop into the cam depression 160ᵃ. This movement of the roller has the effect of displacing against the action of its spring 161 a slide 162 which has a lug projecting from its side. In the circumstances above alluded to, viz. those in which this slide is displaced by the action of the roller 158ᵃ, the lug will be brought into the path of the roller on the clutch lever 89 of the second matrix transfer cam shaft 56 in such a manner that the subsequent movement of the cam 160 will operate through the lug or slide 162 and clutch lever 89 to disengage the clutch and so stop the movement of the second matrix transfer shaft 56 and the galley cam shaft 159. Further, the movement of the link 157 (Figs. 15, 16) which couples the bell crank 156 and cam lever 158 is transmitted through suitable linkage 163 to displace the vertical slide 147 mounted in the separation safety stop bracket 148, the action of which is, as before described in connection with the elevator safety stop, to intercept the horizontal safety stop bar 140 in its movement and so effect the stoppage of the casting shaft.

*Galley mechanism.*—Mounted intermediate of the mold 164 (Figs. 22, 23) and the galley is a fixed type receiving raceway 165 (Fig. 26) having at its end adjacent to the mold an adjustable spring actuated clamp 166. The function of this clamp is to support and sustain the type as they are delivered from the mold by the type pusher 167. The clamp is made of just sufficient length to accommodate all the types which can be delivered to the raceway during the time in which the galley mechanism is operative. Slidably mounted in a slot 168 in the front wall of the type receiving raceway 165 is a frictionally-held abutment 169 which forms a support for the type after they have left the clamp 166, and also during transit to a position directly above the galley. The completed line is transferred through the type receiving raceway 165 on to a sliding floor 170 immediately above the galley. The means for accomplishing this and also for returning the type supporting abutment 169 to its normal position are as follows:—Mounted in a slot 171 parallel with that of the type supporting abutment, is a carriage 172 which has pivoted to it a pair of hooked fingers (hereinbefore referred to as the type delivery finger 153) which, in the normal position of the carriage, lie just to the rear of the end of the line with the hooked ends lifted just out of the raceway. Extending rearwardly of the carriage 172 is a channeled lug 173 which serves as a guide for one end of the bar 154, the other end of which is fixed to a driving slide 174. This slide is guided in the same slot 171 as the carriage 172, its position being on the outer or galley side of the latter.

Movement is given to the bar 154 and driving slide 174 by means of a lever 175 which receives motion in each direction through buffer springs 176 from a cam lever 177 controlled by a three-step cam 177' on shaft 159. The normal position of the driving slide is such as to allow the type abutment 169 to advance to a point corresponding with the length of the longest line permissible. In this position of the bar 154 a stop pin 154ᵇ thereon lies in contact with an arm 178 fixed to the pivot pin 153ᵃ of the hooked fingers 153 in such a manner that the forward movement of the bar to transfer the line to the galley will first of all bring about through this arm the movement of the hooked ends of the fingers 153 into a position to engage with the line, and will then effect the movement of the carriage 172 toward the galley. the arm 178 having come into contact with a pin 172ᵃ on the carriage. The carriage is frictionally held in the slot 171 with just sufficient pressure to prevent its premature movement during these operations. On the return movement of the bar 154 and driving slide 174, a projection 174' on the latter engages with a projection 169' on the type abutment 169 and at a subsequent point in its movement a second stop 154ᶜ on the bar 154 engages with the arm 178 to raise the hooked fingers 153 out of the raceway 165 and to return the carriage 172 and the type abutment 169 to their normal positions. The slide 174 is now retracted to its normal position so as to permit of the advance of the type abutment 169 during the assembly of the succeeding line.

The galley according to this invention is mounted in a plane slightly inclined to the vertical, and the slidable floor 170 to which the types are transferred is adapted to move rearwardly in a plane transversely of the galley by means of a spring 179 and is returned to its normal position by means of a cam 180 on galley shaft 159 and suitable linkage 181. This movement of the floor occurs immediately the line of types has been transferred to it, and is such as to allow the line to descend by gravity on to the preceding line in the galley below it.

The line of types is kept in position and prevented from moving rearwardly during the retraction of the floor 170 by a block 151ᵃ which carries the galley pusher 151 and which rests upon a rearward extension 170ᵃ of the floor in such a manner as to form a support for the feet of the type. The pusher is constituted by a longitudinally projecting rib 151 which extends partly over the line of types and aids the descent of the latter. The block 151ᵃ is spring urged into contact with the floor 170 and is constrained to move in an approximately vertical plane during the inclined rearward movement of the latter, and thus assists the vertical descent of the line into the galley.

The type is supported in the galley by means of a galley block 182 which rests upon an arm 183 extending right across the face of the galley. At one end of the arm and integral therewith is a boss 184 which is slidably mounted upon a screw 185 carried adjacent to the side of the galley and parallel thereto. Midway of the boss and fitting in a slot 184ᵃ thereon is a section of a nut 186 which is attached to a pivoted finger lever 187 so that it can be readily engaged with or disengaged from the screw 185, thereby permitting the arm to be moved to and retained in any position longitudinally of the galley. Means are provided for lowering the arm 183 an amount equal to the body width of the type each time a line is transferred to the galley as follows:— Mounted on the upper end of the screw 185 and for the purpose of rotating the same is a ratchet wheel 188. Mounted co-axially with the latter, but free upon the screw spindle 185 is a pinion 189 carrying a pawl 190 adapted to engage with the ratchet wheel 188. The pinion is oscillated by means of a rack 191 engaging with it, the latter being spring driven in the direction in which it imparts movement to the ratchet wheel and returned by a cam 192 on galley shaft 159 and linkage 193. The spring-urged or working stroke of the rack 191 is adjusted to give such rotary movement to the screw 185 as will lower the arm an amount equal to the body width of the font being dealt with. For this purpose a pin 194 is inserted into one of a number of holes 195 in a casting 196 adjacent to the rack 191 in such a manner as to engage with and determine the spring urged movement of the rack. The holes 195 are suitably located in positions corresponding with the body widths of the fonts coming within the range of the machine. The galley can therefore be adjusted to any font merely by inserting the stop pin 194 into the hole corresponding to that font.

Having thus described the nature of this invention and the best means we know of carrying the same into practical effect, we claim:—

1. In a typographic composing and casting machine, the combination of a magazine, loose matrices having a uniform thickness irrespective of the set width of the types cast therefrom contained in the magazine, mechanism for releasing the matrices in the order desired from the magazine, means for assembling the released matrices in line, and means for producing a justified line of types therefrom controlled independently of the thickness of the matrices.

2. In a typographic composing and casting machine, the combination of a plurality of magazines, loose matrices having a uniform thickness irrespective of the set width of the types cast therefrom contained in the magazines, mechanism for releasing the matrices in the order desired from a magazine, means for assembling the released matrices in line, and means for producing a justified line of types therefrom controlled independently of the thickness of the matrices.

3. In a typographic composing and casting machine controlled by keys of a keyboard, the combination of a number of loose matrices of uniform thickness, a magazine comprising a series of parallel compartments of uniform dimensions for the reception of the matrices, means operated by the keys for releasing the matrices in the order desired from the magazine, means for assembling the released matrices in line, and means for producing a justified line of individual types therefrom controlled independently of the thickness of the matrices.

4. In a typographic composing and casting machine controlled by keys of a keyboard, the combination of a number of loose matrices of uniform thickness and constituting a plurality of fonts, a plurality of magazines each comprising a series of parallel compartments of uniform dimensions, means operated by the keys for releasing matrices in the order desired from a magazine, means for assembling the released matrices in line, and means for producing a justified line of individual types therefrom controlled independently of the thickness of the matrices.

5. In a typographic composing machine the combination of a number of loose matrices having a thickness independent of the set value of the character represented by the matrix and contained in a magazine or magazines, means for releasing matrices from a magazine in the order desired, means controlled by the keys of a keyboard for assembling the released matrices in line, mechanism for measuring the set value in units of a released matrix comprising a units recording element, and means controlled independently of the thickness of the matrices for advancing the said element step by step during the assembly of a line an amount proportional to the set value of the character represented by the matrix released.

6. In a justifying mechanism, the combination of the line measuring member of a units counting mechanism, an automatic proportional divider consisting of a series of independently movable inclined measuring plates, means whereby the particular plate selected according to the number of spaces in the line is advanced to determine the distance between the end of the line measuring member of the units mechanism and a fixed point to which it advances during the composition of the line, and mechanism controlled by the movement of the inclined measuring plate to adjust the mold to give spaces of a proper size to justify the line.

7. In a justifying mechanism, the combination of a series of independently movable inclined measuring plates with a series of slides coöperating with the measuring plates and having inclined ends in contact therewith, the angles of these inclined ends being complements of the angles of the coöperating edges of the measuring plates.

8. In a justifying mechanism, the combination of a series of independently movable inclined measuring plates with a plurality of slides coöperating with the plates and having inclined ends in contact therewith, said slides being coupled in groups, and means for urging the groups of slides against the plates, said means comprising for each group a lever pivotally mounted on the frame of the said mechanism, and a spring attached to one arm of the lever and adapted to turn the lever and thereby urge a second arm of the lever against the said group.

9. In a typographic composing and casting machine, the combination of a magazine, loose matrices having a uniform thickness irrespective of the set width of the types cast therefrom contained in the magazine, mechanism for releasing the matrices in the order desired from the magazine, means for assembling the released matrices in line, means controlled by the said releasing mechanism and independently of the thickness of the matrices for recording the set value of the matrix released, and means for producing a justified line of types.

10. In a typographic composing and casting machine, the combination of loose matrices contained in a magazine or magazines and having a uniform thickness irrespective of the set values of the characters represented by the matrices or the set width of types cast therefrom, and means controlled by the finger keys of the keyboard for releasing the matrices from the respective magazines in the order desired with a power driven mechanism controlled by the keyboard, a power relay operated by the power driven mechanism, and a device for recording the set value of the character represented by any finger key struck, said device being controlled by the said power relay.

11. In a typographic composing and casting machine, the combination of loose matrices contained in a magazine or magazines and having a uniform thickness irrespective of the set values of the characters represented by the matrices or the set width of types cast therefrom, and means controlled by the finger keys of the keyboard for releasing the matrices from the respective magazines in the order desired with a power driven mechanism controlled by the keyboard, a power relay operated by the power driven mechanism, a device for recording the set value of the character represented by any finger key struck, said device being controlled by the said power relay, and means whereby the said power relay drives the said power driven mechanism as and for the purposes described.

12. In a typographic composing and casting machine, the combination of loose matrices contained in a magazine or magazines and having a uniform thickness irrespective of the set values of the characters represented by the matrices or the set width of types cast therefrom, a manually controlled power driven keyboard and means controlled by the finger keys of the keyboard for releasing the matrices from the respective magazines in the order desired with a set value recording device, means operated by the finger keys for actuating the said device and thereby causing the recording of the set value of the character represented by the finger key struck, and means whereby the set value recorded by the device on the operation of a key may be changed at will.

13. In a typographic composing and casting machine, the combination of loose matrices contained in a magazine and having a uniform thickness irrespective of the set values of the characters represented by the matrices or the set width of types cast therefrom, a manually controlled, power driven keyboard, and means controlled by the finger keys of the keyboard for releasing the matrices from the magazine in the order desired with a set value recording device, means operated by the finger keys for actuating the said device and thereby causing the recording of the set value of the character represented by the finger key struck, said means comprising a set of transverse frames and a set of adjustably pivoted units accounting levers controlled by the finger keys, each lever having a number of pivot grooves whereby its position may be altered said means comprising a set of transverse frames and the recorded set value consequently changed.

14. In a typographic composing and casting machine, the combination of loose matrices contained in a plurality of magazines and having a uniform thickness irrespective of the set values of the characters represented by the matrices or the set width of types cast therefrom, a manually controlled power driven keyboard and means controlled by the finger keys of the keyboard for releasing the matrices from the respective magazines in the order desired with a set value recording device, means operated by the finger keys for actuating the said device and thereby causing the recording of the set value of the character represented by the finger key struck, means whereby the set value recorded by the device on the operation of a key may be changed at will, said latter means comprising a plurality of sets of units accounting levers (7, 8) controlled by the finger keys, horizontal bails (14) operated by the levers, transversely mounted levers (15) operated by the bails, a power driven mechanism controlled by the levers, and a measuring member (16) moved by the said power driven mechanism and operatively coupled with the set value recording device (4).

15. In a typographic composing and casting machine, the combination of loose matrices contained in a plurality of magazines and having a uniform thickness irrespective of the set values of the characters represented by the matrices or the set width of the types cast therefrom, a manually controlled power driven keyboard and means controlled by finger keys of the keyboard for releasing the matrices from the respective magazines in the order desired with a set value recording device, adjustable mechanism operated by the finger keys for actuating the said device and thereby causing the recording of the set value of the character represented by the finger key struck, a magazine changing device, and means governed by the position of the magazine changing device and adapted to adjust the said mechanism whereby a finger key is adapted to cause to be recorded a set value which may vary according to the magazine in use.

16. In a typographic composing and casting machine wherein loose matrices contained in a pair of magazines and having a uniform thickness irrespective of the set values of the characters represented by the matrices or the set width of the cast types are assembled in line by means of the finger keys of a keyboard and a line of justified individual types produced therefrom, means for releasing the matrices from a magazine in the order desired, key rods actuated by the finger keys, mechanism controlled by the key rods for recording the set value in units of the matrix released, said mechanism comprising two rows of units accounting levers, and means for bringing one or the other of the rows of levers into operative relation with the key rods according as a matrix is released from one or other of the magazines.

17. In a typographic composing and casting machine wherein loose matrices contained in a pair of magazines and having a uniform thickness irrespective of the set values of the characters represented by the matrices or the set width of the cast types are assembled in line by means of the finger keys of a keyboard and a line of justified individual types produced therefrom, means for releasing the matrices from a magazine in the order desired, key rods actuated by the finger keys, mechanism controlled by the key rods for recording the set value in units of the matrix released, said mechanism comprising two rows of units accounting levers, a magazine changing lever, and means for bringing one or other of the rows of levers into operative relation with the key rods according as a matrix is released from one or other of the magazines, said latter means comprising a slidably mounted guide adapted to shift the two rows of levers, and connections between the guide and the magazine changing lever whereby the guide moves synchronously with the magazine changing lever.

18. In a typographic composing and casting machine wherein loose matrices contained in a magazine or magazines and having a uniform thickness irrespective of the set values of the characters represented by the matrices or the set width of the type cast therefrom are assembled in line by means of the finger keys of a keyboard and a line of justified individual types produced therefrom, means for releasing the matrices from a magazine in the order desired, mechanism for recording the set value in units of a released matrix comprising a units recording element and an escapement device including a units counting wheel and a locking pawl therefor, means for advancing from zero position the said element step by step during the assembly of a line an amount proportional to the set values of the character represented by the matrices released, mechanism for resetting to zero position the units recording element comprising a spring-urged lever (30), a rotatable cam (33), a cam lever (32) coöperating therewith, and a vertically movable plunger (31) connected with the cam lever and adapted to engage one arm of and thereby turn the spring-urged lever (30), causing a second arm of the lever (30) to contact with an end of the units recording element and return the same to zero position, and means for releasing the pawl and units counting wheel to permit the said element to be reset or return to zero, said means comprising a sleeve (35) carried by the plunger (31), a link (38) connected to the pawl (39) of the units counting wheel, a lever (36) connected to the link (38), a detent (37) pivoted on lever (36) and coöperating with the sleeve (35) to turn the pawl (39) and thereby release the units counting wheel.

19. In a typographic composing and casting machine, the combination of a magazine, loose matrices having a uniform thickness irrespective of the set width of the types cast therefrom contained in the magazine, mechanism comprising finger keys of a keyboard for releasing the matrices in the order desired from the magazine, means for assembling the released matrices in line, means controlled by the said matrix releasing mechanism and independent of the thicknesses of the matrices for recording the set value of the matrix released, means comprising an auxiliary set of finger keys adapted to control the set value recording mechanism independently of the matrix releasing mechanism.

20. In a typographic composing and casting machine, the combination of loose matrices contained in a magazine or magazines and having a uniform thickness irrespective of the set values of the characters represented by the matrices or the set width of types cast therefrom, and means controlled by the finger keys of the keyboard for releasing the matrices from the respective magazines in the order desired with a power driven mechanism controlled by the keyboard, a power relay operated by the power driven mechanism, a device for recording the value of the character represented by any finger key struck, said device being controlled by the said power relay, and means comprising an auxiliary set of finger keys and mechanism operated thereby adapted to control directly the power relay.

21. In a typographic composing and casting machine controlled by the keys of a keyboard, the combination of a magazine, a number of loose matrices contained in the magazine, means for releasing the matrices in the order desired from the magazine, means for assembling the released matrices in line, means for separating the matrices comprised in an assembled line, a casting mechanism comprising a mold, means for presenting the separated matrices one by one to the casting mechanism to form lines of individual cast types, and means for transferring an assembled line of matrices from the assembly position to a waiting position intermediate of the assembly position and the separating position prior to the completion of the casting of the preceding line of types.

22. In a typographic composing and casting machine controlled by the keys of a keyboard, the combination of a magazine, a number of loose matrices contained in the magazine, means for releasing the matrices in the order desired from the magazine, means for assembling the released matrices in line, means for separating the matrices comprised in an assembled line, a casting mechanism comprising a mold, means for presenting the separated matrices one by one of the casting mechanism to form lines of individual cast types, and means for transferring an assembled line of matrices from the assembly position to a waiting position intermediate of the assembly position and the separating position prior to the completion of the casting of the preceding line of types, and separate means for transferring the assembled line of matrices from the intermediate waiting position to the matrix separating position.

23. In a typographic composing and casting machine controlled by the keys of a keyboard, the combination of a magazine, a number of loose matrices contained in the magazine, means for releasing the matrices in the order desired from the magazine, means including an assembly box for assembling the released matrices in line, means for separating the matrices comprised in an assembled line, a casting mechanism comprising a mold, means for presenting the separated matrices one by one to the casting mechanism to form lines of individual cast types and means for transferring an assembled line of matrices from the assembly position to the separating position in a plurality of distinct steps comprising a moving cam shaft, a matrix transfer device operated thereby, a second independently moving cam shaft controlled by the movement of the first cam shaft, and a second matrix transfer device controlled by the second cam shaft, the first said transfer device adapted to transfer the assembled line from the assembly box into a waiting position in rear of the second transfer device, and the latter device adapted to transfer the assembled line from the waiting position to the separating position.

24. In a typographic composing and casting machine controlled by the keys of a keyboard, the combination of a magazine, a number of loose matrices contained in the magazine, means for releasing the matrices in the order desired from the magazine, means for assembling the released matrices in line, means for separating the matrices comprised in an assembled line, a casting mechanism comprising a mold, means for presenting the separated matrices one by one to the casting mechanism to form lines of individual cast types, and means for transferring an assembled line of matrices in stages from the assembly position to the separating position comprising a vertically movable assembly box, a receiving raceway in line with the latter when elevated, a reciprocating matrix transfer device for transferring the matrices from the assembly box into the raceway, and a second matrix transfer device operating to transfer the line of matrices along the raceway to the separating position.

25. In a typographic composing and casting machine controlled by the keys of a keyboard, the combination of a magazine, a number of loose matrices contained in the magazine, means for releasing the matrices in the order desired from the magazine, means for assembling the released matrices in line, means for separating the matrices comprised in an assembled line, a casting mechanism comprising a mold, means for presenting the separated matrices one by one to the casting mechanism to form lines of individual cast types, and means for transferring an assembled line of matrices in stages from the assembly position to the separating position comprising a vertically movable assembly box, a receiving raceway in line with the latter when elevated, a reciprocating matrix transfer device for transferring the matrices from the assembly box into the raceway, means automatically operating to maintain the line of matrices stationary in the raceway, and a second matrix transfer device operating to transfer the line of matrices along the raceway to the separating position.

26. In a typographic composing and casting machine controlled by the keys of a keyboard, the combination of a magazine, a number of loose matrices contained in the magazine, means for releasing the matrices in the order desired from the magazine, means for assembling the released matrices in line, means for separating the matrices comprised in an assembled line, a casting mechanism comprising a mold, means for presenting the separated matrices one by one to the casting mechanism to form lines of individual cast types, means for transferring an assembled line of matrices from the assembly position to the separating position in a plurality of distinct steps comprising a vertically movable assembly box, a moving cam shaft, a matrix transfer device operated thereby, a second independently moving cam shaft controlled by the movement of the first cam shaft, a second matrix transfer device controlled by the second cam shaft, the first said transfer device adapted to transfer the assembled line from the assembly box into a waiting position in rear of the second transfer device, and the second transfer device adapted to transfer the assembled line from the waiting position to the matrix separating position, and means controlled by the first cam shaft for starting the movement of the second cam shaft immediately the assembled line of matrices has reached the waiting position.

27. In a typographic composing and casting machine controlled by the keys of a keyboard, the combination of a magazine, a number of loose matrices contained in the magazine, means for releasing the matrices in the order desired from the magazine, means for assembling the released matrices in line, means for separating the matrices comprised in an assembled line, a casting mechanism comprising a mold, means for presenting the separated matrices one by one to the casting mechanism to form lines of individual cast types, means for transferring an assembled line of matrices from the assembly position to the separating position in a plurality of distinct steps comprising a vertically movable assembly box, a moving cam shaft, a matrix transfer device operated thereby, a second independently moving cam shaft controlled by the movement of the first cam shaft, and a second matrix transfer device controlled by the second cam shaft, the first said transfer device adapted to transfer the assembled line from the assembly box into a waitiing position in rear of the second transfer device, and the second transfer device adapted to transfer the assembled line from the waiting position to the matrix separating position, a casting shaft for operating the mold, mechanism operated by the casting shaft for separating the matrices and presenting them one by one to the mold, and means controlled by the movement of the second cam shaft for starting the operation of the casting shaft immediately the assembled line of matrices has been transferred from the waiting to the separating position.

28. In a typographic composing and casting machine controlled by the keys of a keyboard, the combination of a magazine, a number of loose matrices contained in the magazine, means for releasing the matrices in the order desired from the magazine, means for assembling the released matrices in line, means for separating the matrices comprised in an assembled line, a casting mechanism comprising a mold, means for presenting the separated matrices one by one to the casting mechanism to form lines of individual cast types, means for transferring an assembled line of matrices from the assembly position to the separating position in a plurality of distinct steps comprising a vertically movable assembly box, a cam shaft, a matrix transfer device operated thereby, a second independently moving cam shaft controlled by the movement of the first cam shaft, and a second matrix transfer device controlled by the second cam shaft, the first said transfer device adapted to transfer the assembled line from the assembly box into a waiting position in rear of the second transfer device, and the second transfer device adapted to transfer the assembled line from the waiting position to the matrix separating position, a casting shaft adapted to operate the mold, mechanism operated by the casting shaft for separating the matrices and presenting them one by one to the mold, means controlled by the movement of the second cam shaft for starting the operation of the casting shaft, and means controlled by the stoppage of the casting shaft on completion of the casting of a line for starting the operation of the second matrix transfer device when an assembled line of matrices is in the waiting position.

29. In a typographic composing and casting machine controlled by the keys of a keyboard, the combination of a magazine, a number of loose matrices contained in the magazine, means for releasing the matrices in the order desired from the magazine, means for assembling the released matrices in line, means for separating the matrices comprising in an assembled line, a casting mechanism comprising a mold, means for presenting the separated matrices one by one to the casting mechanism to form lines of individual cast types, means for transferring an assembled line of matrices from the assembly position to the separating position in a plurality of distinct steps comprising a vertically movable assembly box, a moving cam shaft, a matrix transfer device operated thereby, a second independently moving cam shaft controlled by the movement of the first cam shaft, and a second matrix transfer device controlled by the second cam shaft, the first said transfer device adapted to transfer the assembled line from the assembly box into a waiting position in rear of the second transfer device, and the second transfer device adapted to transfer the assembled line from the waiting position to the matrix separating position, a casting shaft adapted to operate the mold, mechanism operated by the casting shaft for separating the matrices and presenting them one by one to the mold, means controlled by the movements of the second cam shaft for starting the operation of the casting shaft, means controlled by the stoppage of the casting shaft on completion of the casting of a line for starting the operation of the second matrix transfer device when an assembled line of matrices is in the waiting position, and means automatically operating to prevent the stoppage of the casting shaft from causing the operation of the second matrix transfer device when the stoppage is due to any cause other than the completion of the casting of a line.

30. In a typographic composing and casting machine, in combination with the casting mechanism, a magazine, matrices having a uniform thickness irrespective of the set width of the types cast therefrom contained in the magazine, mechanism controlled by the keyboard for releasing the matrices from the magazine, means for assembling the released matrices in line, and a justification mechanism including a device controlled by the said releasing mechanism for recording the set value of the matrices released, an intermediate set value recording device, means for transferring the set value recorded by the first said device to the second device, and means for transferring the setting of the said second device to the casting mechanism at an appropriate time.

31. In a typographic composing and casting machine, in combination with the casting mechanism including a mold having a justifying wedge, a magazine, matrices having a uniform thickness irrespective of the set width of the types cast therefrom contained in the magazine, mechanism controlled by the keyboard for releasing the matrices from the magazine, means for assembling the released matrices in line, and a justification mechanism including a device controlled by the said releasing mechanism for recording the set value of the matrices released, an intermediate set value recording device, means for transferring the set value recorded by the first said device to the second device, means for locking the intermediate recording device during the justification of an assembled line of matrices, and means for transferring the setting of the intermediate recording device to the mold justifying wedge when the assembled line of matrices is transferred to the casting mechanism.

32. In a typographic composing and casting machine, the combination of a casting mechanism comprising a mold having a justifying wedge and a vertically moving slide for positioning the wedge, with a justifying mechanism including a vertically movable justifying slide for determining the justification value, and an intermediate recording device comprising a pivoted lever and a locking device therefor, one end of the lever coöperating with the justification value determining slide and the other end with the first said vertically movable slide, whereby the justification value can be transferred to and retained by the intermediate recording lever and from thence transferred to the mold justifying wedge at a later phase of the working of the machine.

33. In a typographic composing and casting mechanism comprising a mold having a justifying wedge and in which loose matrices are assembled in line in one position and in another position are separated for presentation to the mold to form lines of individual types, means for transferring an assembled line of matrices from the assembly position to the separating position in a plurality of distinct steps comprising a moving cam shaft, a matrix transfer device operated thereby, a second independently moving cam shaft controlled by the movement of the first cam shaft, and a second matrix transfer device controlled by the second cam shaft, the first said transfer device adapted to transfer the assembled line from the assembly box into a waiting position in rear of the second transfer device, and the second transfer device adapted to transfer the assembled line from the waiting position to the matrix separating position, and a justification mechanism including a device for recording the set value of the released matrices, an intermediate set value recording device, means controlled by the second matrix transfer cam shaft for transferring the set value recorded by the said intermediate set value recording device to the mold justifying wedge.

34. In a typographic composing and casting machine, a pivoted guide bar, a slidable matrix supporting abutment mounted upon the guide bar, a casting mechanism, a line transferring mechanism arranged to transfer the matrices with the slidable abutment to the casting mechanism, and means for elevating the guide bar to withdraw the abutment from in front of the matrices immediately before the latter reach the casting mechanism.

35. In a typographic composing and casting machine, an upwardly spring-urged pivoted guide bar, a slidable matrix supporting abutment mounted on the guide bar, means adapted to retain the guide bar in a horizontal position, said means comprising a pivoted latch, and means carried by the abutment adapted to engage and turn the latch and thereby release the guide bar.

36. In a typographic composing and casting machine, a pivoted guide bar, a spring adapted when tensioned to urge the guide bar upwardly, a slidable matrix supporting abutment mounted upon the guide bar, a casting mechanism, a line transferring mechanism including a pivoted transfer lever arranged to transfer the matrices with the slidable abutment to the casting mechanism, means for elevating the guide bar to withdraw the abutment from in front of the matrices immediately before the latter reach the casting mechanism, means controlled by the transfer lever in its movement to its initial position for tensioning the spring, thereby urging the guide bar in an upward direction, and means controlled by the transfer lever in its forward movement for releasing the spring, thereby permitting the guide bar to fall to a horizontal position.

37. In a typographic composing and casting machine, the combination with a pivoted guide bar, a slidable matrix supporting abutment mounted upon the guide bar, a casting mechanism, a line transferring mechanism arranged to transfer the matrices with the slidable abutment to the casting mechanism, and means for elevating the guide bar to withdraw the abutment from in front of the matrices immediately before the latter reach the casting mechanism, of a stop adapted to encounter the abutment when the latter is in its elevated position and to clear the abutment when it is restored to its normal position.

38. In a machine of the class described, a magazine, a plurality of loose matrices contained in said magazine, a casting mechanism, a casting shaft for driving said casting mechanism, keyboard-actuated means for assembling said matrices in a line and presenting them to the casting mechanism, an elevated matrix distributing mechanism for returning said matrices to the magazine, means controlled by the movement of the casting shaft for raising small quantities of matrices less than a full line in length from the casting to the distributing mechanism at regular intervals during the casting of a line, said means comprising a rising and falling box for the reception of the matrices, and driving mechanism operatively connecting said box and the casting shaft.

39. In a typographic composing and casting machine wherein loose matrices contained in a magazine or magazines are assembled in lines by the medium of keys of a keyboard presented to a casting mechanism driven from a casting cam shaft and transferred to an elevated matrix distributing mechanism, means for raising small quantities of matrices less than a full line in length from the casting to the distributing mechanism at regular intervals during the casting of a line, said means comprising an elevator box for the reception of matrices, an elevating cam shaft, mechanism connecting the elevator and the elevating cam shaft, and gearing connecting the elevating shaft and casting shaft adapted to cause the former shaft to revolve once for an integral number of revolutions of the latter shaft.

40. In a typographic composing machine, the combination with a separating mechanism, a reassembly plunger or finger and a reciprocating elevator, and a reassembly channel or box intermediate of the reassembly plunger and elevator.

41. In a typographic composing and casting machine, a reassembly device consisting of a reciprocating elevator, a reciprocating reassembly plunger, a reassembly channel, and means controlled by the elevator whereby the reassembly plunger is adapted to deliver the whole of the matrices in the reassembly channel to the elevator while normally delivering the matrices one by one to the reassembly channel.

42. In a typographic composing machine, a reassembly device comprising a reciprocating elevator, a reassembly channel, a reassembly plunger, means for reciprocating the plunger to and from the elevator consisting of a spring-urged pivoting lever and a rotating cam, and means for interrupting the plunger in its passage to the elevator.

43. In a typographic composing machine, a reassembly device comprising a reciprocating elevator, a reassembly channel, a reassembly plunger, means for reciprocating the plunger to and from the elevator consisting of a spring-urged pivoted lever and a rotating cam, means for interrupting the plunger in its passage to the elevator, and means controlled by the elevator for rendering the said interrupting means inoperative for the purpose described.

44. In a typographic composing and casting machine for producing a line of justified individual types, the combination of loose matrices contained in a magazine, means controlled by a finger board for releasing the matrices in the order desired from the magazine, means for assembling the matrices, means for separating assembled matrices, means for transferring an assembled line of matrices to the separating mechanism, a type casting device, means for separating and presenting the separated matrices one by one to the casting device to produce individual cast types, mechanism for assembling the cast types in line, mechanism for returning the matrices from the casting device to the magazine including an elevated matrix distributing device and an elevator for raising the matrices from the casting device to the distributer, and a safety device operating automatically for unclutching the driving shaft from the machine on the occurrence of an improper action of any one of the said mechanisms, said safety device comprising two bars reciprocating in directions at right angles to one another and in coöperative relation, and an operative connection between one of the bars and the clutch on the driving shaft, the other bar being spring-urged into contact with all of the said mechanisms and adapted, when prevented from making its full stroke, to permit the first bar to make a full stroke, thereby causing the said connection to declutch the driving shaft from the machine.

45. In a typographic composing and casting machine wherein loose matrices contained in a magazine or magazines are assembled in lines by the medium of keys of a keyboard, presented to a casting mechanism and transferred to an elevated matrix distributing mechanism, the combination of means including a reciprocating elevator for raising the matrices from the casting mechanism to the distributing mechanism, with a safety device operating automatically to unclutch the driving shaft from the machine on the occurrence of an improper action of the elevator thereof, said device comprising two bars reciprocating in directions at right angles to one another and in coöperative relation, one of said bars being spring-urged into contact with said elevator and adapted when prevented from making its full stroke to permit the second bar to make a full stroke, thereby actuating mechanism operating to declutch the driving shaft from the machine, and means controlled by the elevator whereby its failure to leave either of its extreme positions will operate to obstruct the movement of the spring-urged bar for the purpose described.

46. In a typographic composing and casting machine in which loose matrices are released from a magazine and assembled in line in one position in an assembly box and in another position are separated for presentation separately to a mould to form lines of individual cast types, means for transferring an assembled line of matrices from the assembly position to the separating position in a plurality of distinct steps comprising a moving cam shaft, a matrix transfer device operated thereby, a second independently moving cam shaft controlled by the movement of the first cam shaft, and a second matrix transfer device controlled by the second cam shaft, the first said transfer device adapted to transfer the assembled line from the assembly box into a waiting position in rear of the second transfer device, and the second transfer device adapted to transfer the assembled line from the waiting position to the matrix separating position, a safety stop mechanism operating to de-clutch the machine from the driving shaft, and means whereby the safety stop mechanism is adapted to stop the movement of the casting shaft and also of the second matrix transfer shaft.

47. In a galley mechanism for typographic composing machines, a reciprocating type transfer carriage, a frictionally held type-abutment, a main driving slide for reciprocating the carriage and resetting the type abutment and means comprising a three step cam and a pivot lever adapted first to advance the said slide from its normal position, then to retract it to the rear of that position, and finally to return it to the said position, whereby said slide in advancing from the normal position engages the type transfer carriage to deliver the types to the galley, and when retracted retypes both the type transfer carriage and stores both the type transfer carriage and type abutment to their initial positions and on being returned to the normal position permits of the free advance of the type abutment.

48. In a galley mechanism for typographic composing machines, an inclined galley, a slidable type-supporting floor adapted to be withdrawn to lower a line of type into the galley, a type pusher which is spring-urged into contact with the floor, a type supporting galley block, and means for lowering the latter, other than by the pressure of the type pusher as each type line is lowered into the galley.

49. In a galley mechanism for typographic composing machines, an inclined galley, a galley block or type support, an arm carrying the support and extending across the galley, and adjustable means for lowering the arm and support longitudinally of the galley by a body width of type as each successive line of type is delivered to the galley.

50. In a galley mechanism for typographic composing machines, a galley, a type support, an arm carrying the support, a spindle having a screwed portion in mesh with the arm, and means for rotating the screw, said means comprising a pinion fixed to the spindle, a second pinion loosely mounted on the spindle, a pawl carried by the second pinion and coöperating with the first pinion, a rack in mesh with the second pinion and mechanism for moving the rack a variable amount according to the body width of the type delivered to the galley.

51. In a galley mechanism for typographic composing machines, a galley, a type support, an arm carrying the support, a spindle having a screwed portion in mesh with the arm and means for rotating the screw, said means comprising a pinion fixed to the spindle, a second pinion loosely mounted on the spindle, a pawl carried by the second pinion and coöperating with the first pinion, a spring controlled rack in mesh with the second pinion and mechanism for moving the rack any variable amount according to the body width of the type delivered to the galley, said mechanism comprising a driving cam shaft, a driving connection between the shaft and the rack and means including an adjustable abutment in the path of the rack whereby the working stroke of the rack may be varied and the galley lowered an amount equal to the body width of the type delivered to the galley.

In testimony whereof we have signed our names to this specification in the presence of two subscribing witnesses.

PERCY WALTER DRUITT.
WILLIAM ROBERT GILPIN.

Witnesses:
 JOSEPH MILLARD,
 W. J. SKERTEN.